Feb. 3, 1959     L. S. SNYDER ET AL     2,872,110
FLEXIBLE ELECTRONIC COMMUTATOR
Filed Jan. 15, 1954     14 Sheets-Sheet 2
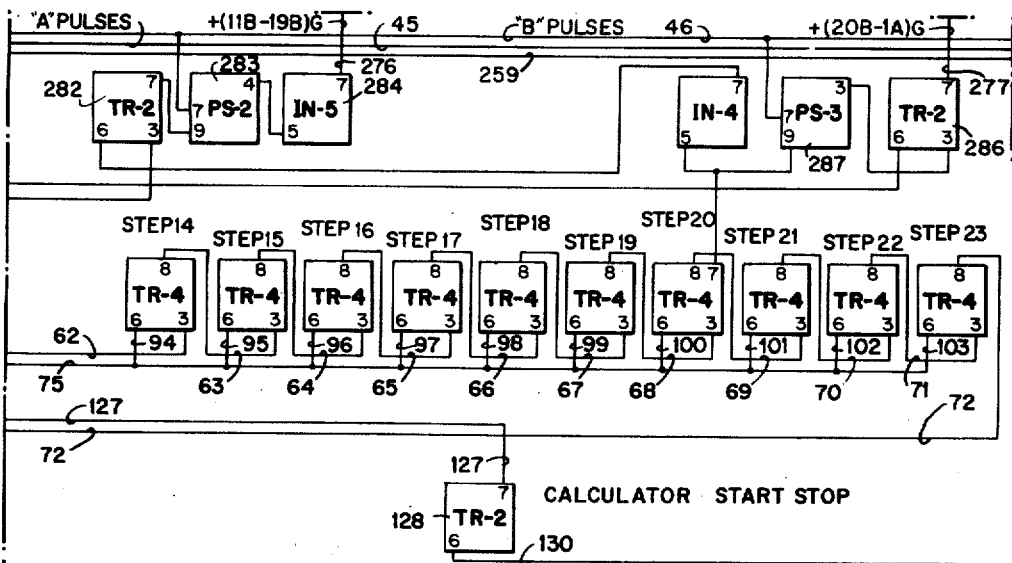
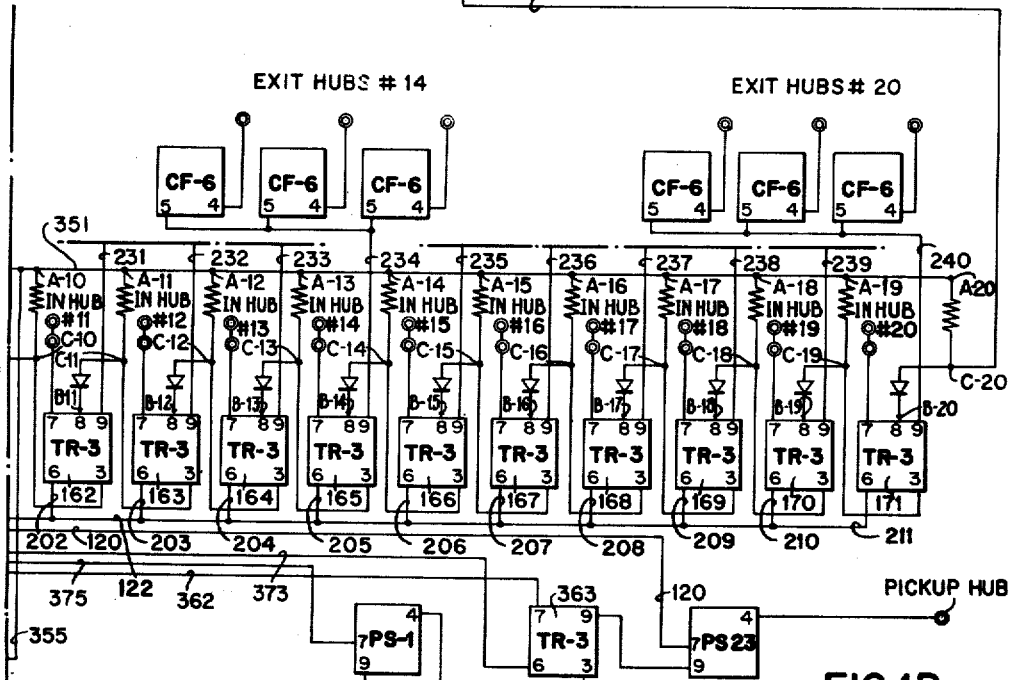
FIG.1B
INVENTORS
LEONARD S. SNYDER
WILFORD M. WITTENBERG
BY Murray Nones
ATTORNEY

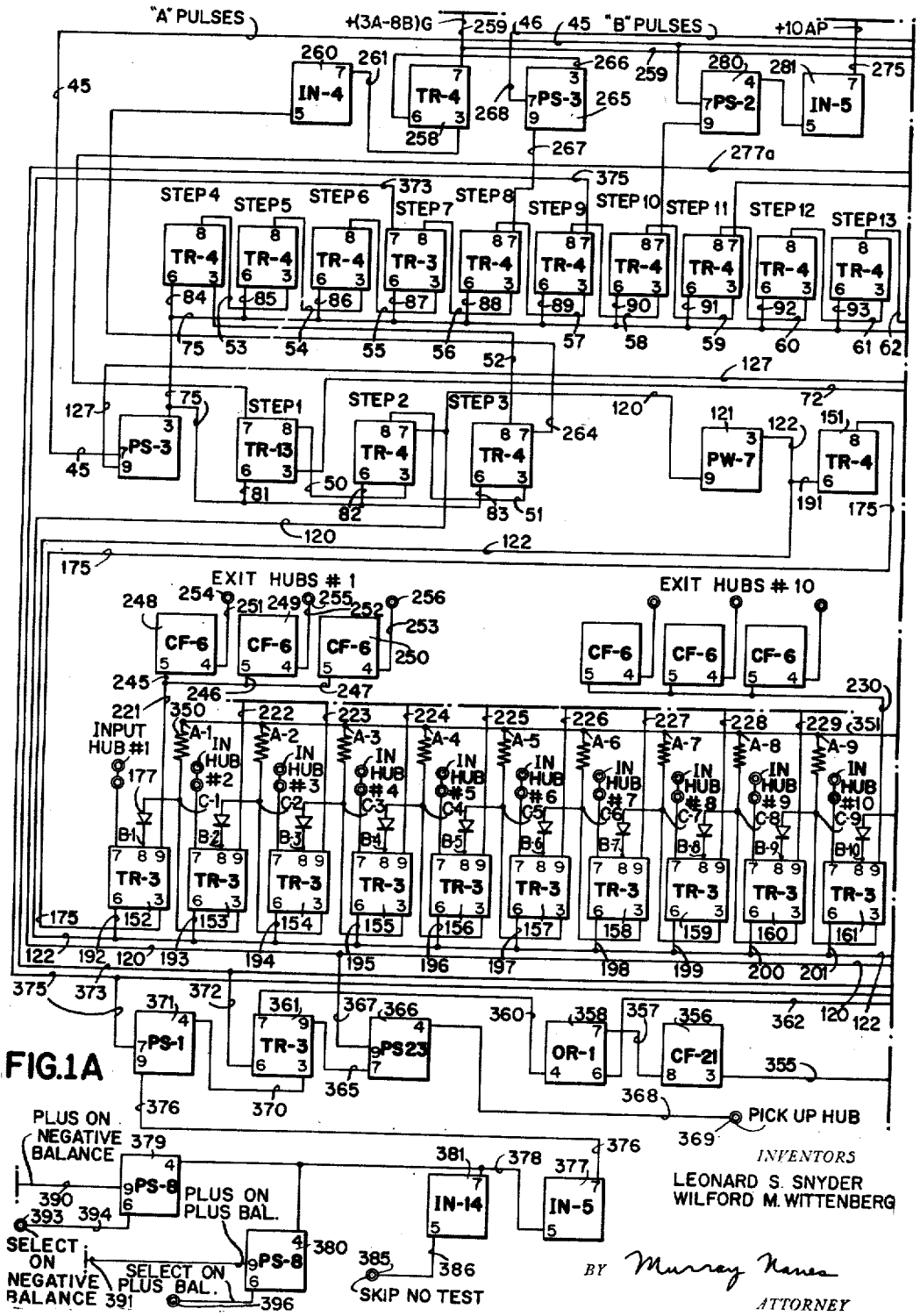

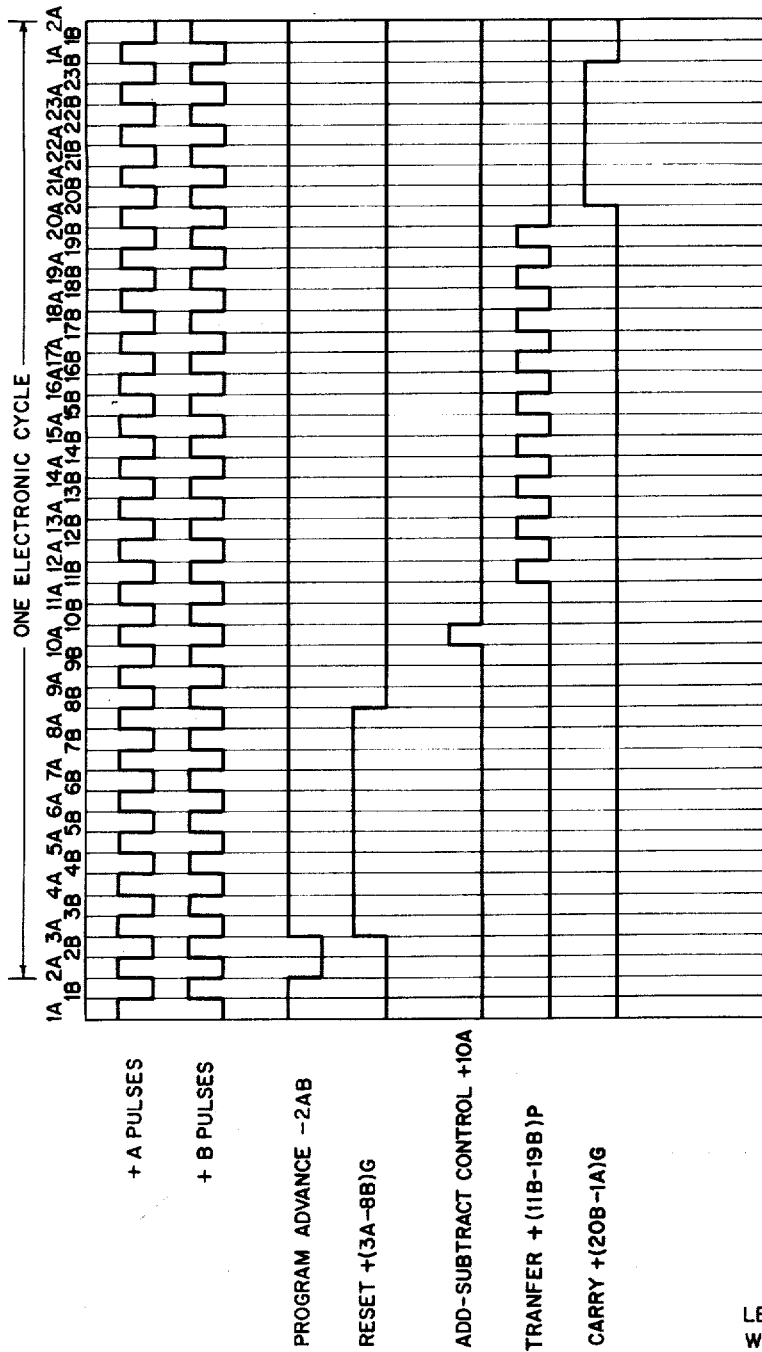

FIG. 9

Feb. 3, 1959  L. S. SNYDER ET AL  2,872,110
FLEXIBLE ELECTRONIC COMMUTATOR
Filed Jan. 15, 1954  14 Sheets-Sheet 9

*INVENTORS*
LEONARD S. SNYDER
WILFORD M. WITTENBERG

BY Murray Nanes
*ATTORNEY*

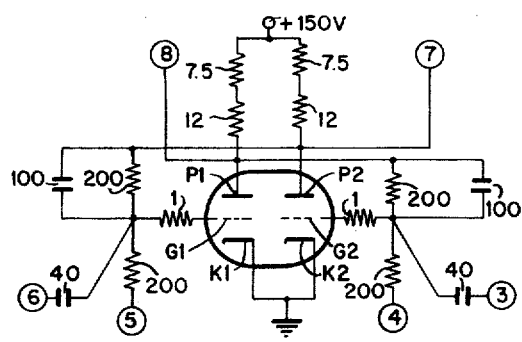
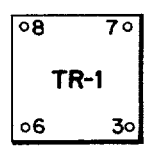
FIG. 16
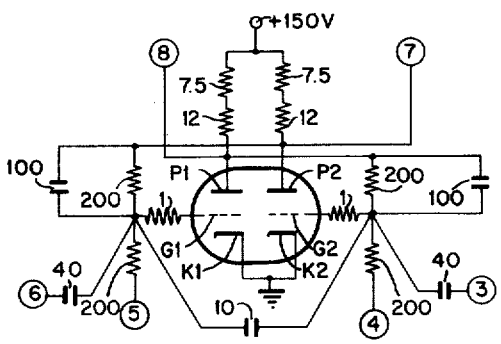
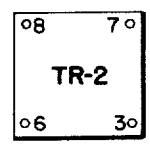
FIG. 17
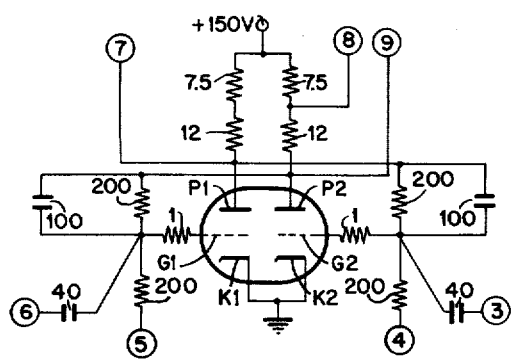
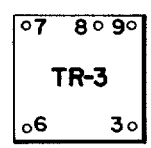
FIG. 18
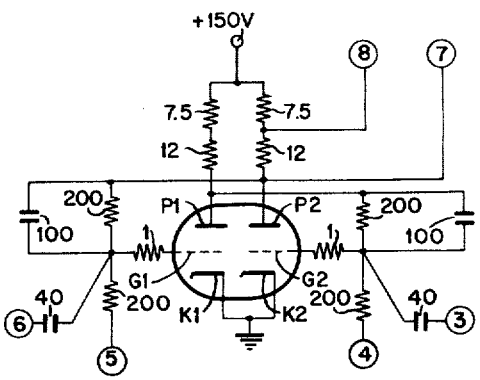
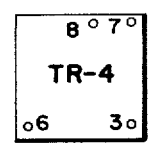
FIG. 19
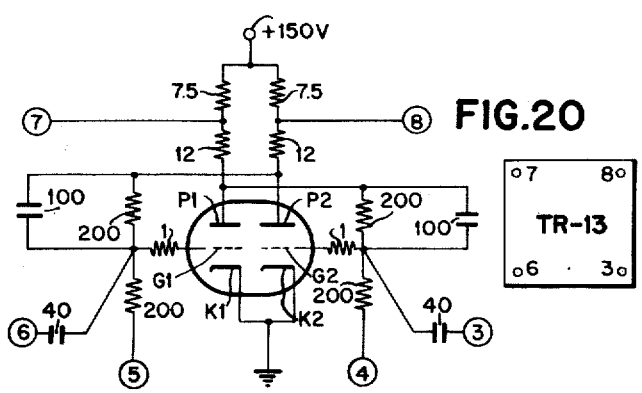
FIG. 20
*INVENTORS*
LEONARD S. SNYDER
WILFORD M. WITTENBERG
BY *Murray Nones*
*ATTORNEY*

Feb. 3, 1959   L. S. SNYDER ET AL   2,872,110
FLEXIBLE ELECTRONIC COMMUTATOR
Filed Jan. 15, 1954   14 Sheets-Sheet 11

*INVENTORS*
LEONARD S. SNYDER
WILFORD M. WITTENBERG

BY Murray Nemes
*ATTORNEY*

Feb. 3, 1959
L. S. SNYDER ET AL
2,872,110
FLEXIBLE ELECTRONIC COMMUTATOR
Filed Jan. 15, 1954
14 Sheets-Sheet 12
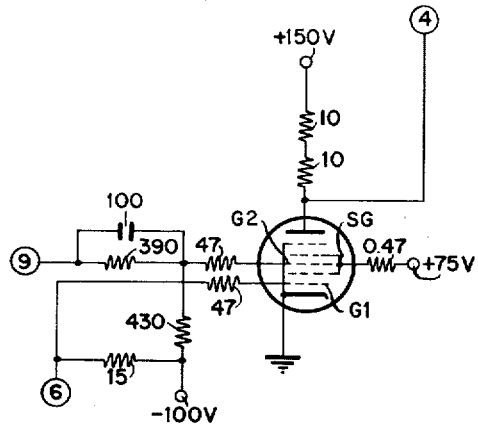
FIG.25
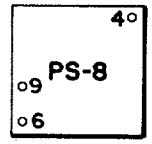
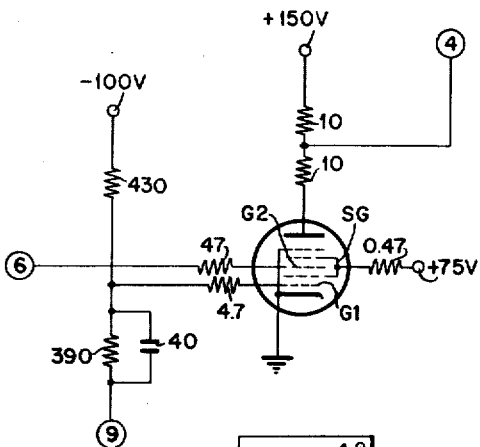
FIG.26
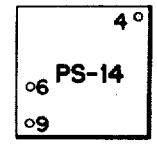
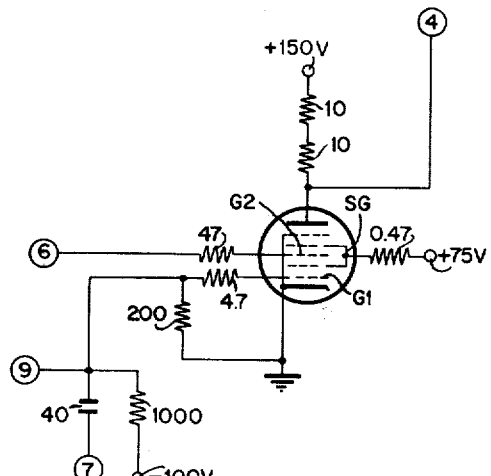
FIG.27
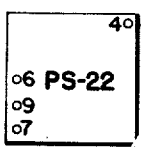
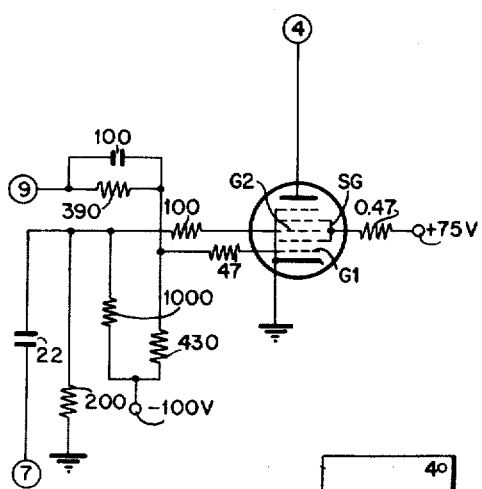
FIG.28
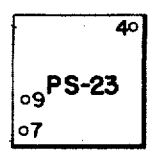
INVENTORS
LEONARD S. SNYDER
WILFORD M. WITTENBERG
BY Murray Nanes
ATTORNEY Feb. 3, 1959

L. S. SNYDER ET AL 2,872,110

FLEXIBLE ELECTRONIC COMMUTATOR

Filed Jan. 15, 1954

*INVENTORS*
LEONARD S. SNYDER
WILFORD M. WITTENBERG

BY Murray Nanes
*ATTORNEY*

Feb. 3, 1959     L. S. SNYDER ET AL     2,872,110
FLEXIBLE ELECTRONIC COMMUTATOR
Filed Jan. 15, 1954                        14 Sheets-Sheet 14
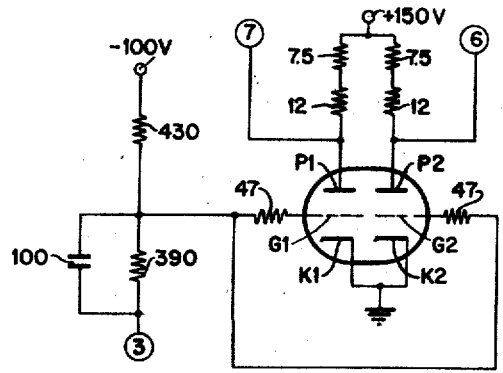
FIG.34
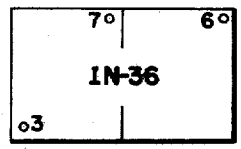
FIG.35
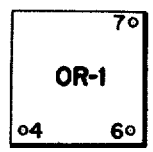
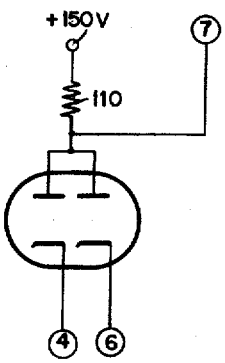
FIG.36
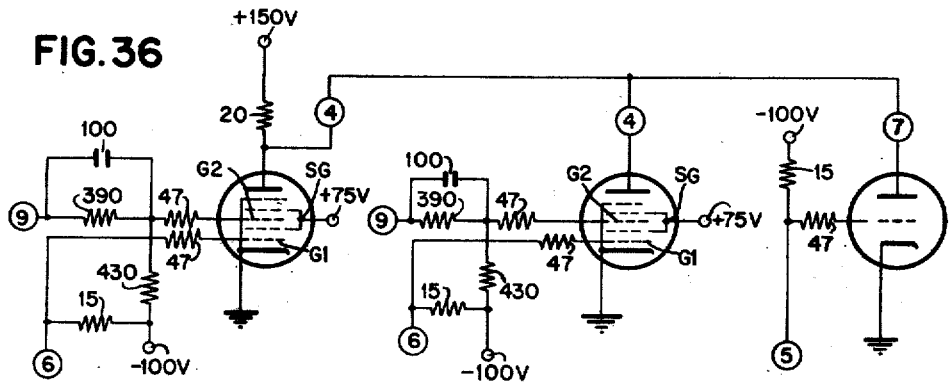
*INVENTORS*
LEONARD S. SNYDER
WILFORD M. WITTENBERG
BY *Murray Nanes*
               *ATTORNEY*

United States Patent Office 2,872,110
Patented Feb. 3, 1959

2,872,110

FLEXIBLE ELECTRONIC COMMUTATOR

Leonard S. Snyder, Wappinger Falls, and Wilford M. Wittenberg, Poughkeepsie, N. Y., assignors to International Business Machines Corporation, New York, N. Y., a corporation of New York Application January 15, 1954, Serial No. 404,310

12 Claims. (Cl. 235—61)

This invention relates to calculator programming and more particularly to means for skipping and iterating program steps in an electronic commutator type program control unit.

In the patent to R. L. Palmer et al., 2,658,681, issued November 10, 1953, there is disclosed a combination of machines, for carrying out complex calculations, consisting of an electronic calculator and a summary punch. The calculator includes as certain elements thereof, a number of electronic storage units, an electronic accumulator and a program unit. The summary punch in addition to its punching functions is employed to read cards and feed the factors taken therefrom into these storage units. The entry and exit positions of all these storage units and of the accumulator are internally commonly connected to an exit channel and an entry channel, the factors being transferred from the storage units to the accumulator or vice versa over these channels under control of the program unit which controls the transfers in a desired sequence. All calculations take place in the accumulator which, during multiplication and division, acts jointly with a multiplier-quotient unit. The results are then read out from the calculator to the summary punch where they are punched in the same record cards from which the original factors were read.

The program unit of the calculator supplies a series of sequential voltages to output hubs which thus indicate which program step is "on" and activates any program functions which may be plug-wired to the hubs. The program unit is an open electronic ring which advances, one step at a time, and shuts itself off after running its course of steps. The length of one program step, except when multiplying or dividing, is one cycle of a primary timer ring. The program ring is stepped along by pulses from the primary timer which comprises a closed electronic ring that advances, step by step to the last stage and then repeats its operation.

More specifically, the primary timer is advanced from its first position, by pulses from a multivibrator, and each time it reaches its second step, it emits a pulse which advances the program ring one step. The primary timer ring in addition to driving the program open ring, controls circuits which develop gating pulses and other pulses for determining the sequence of operation, within a particular program step.

In the calculator disclosed in said Palmer et al. patent, the program unit is (with the exception noted in said above-mentioned patent) inflexible, in that once it is pluggably wired for a desired sequence, it must continue through and actually carry out the steps of that particular sequence for which it was plugged. The novel means of the present invention provide an extremely flexible combination of primary timer and program unit in which a novel skip and iteration circuit is provided to select whether subsequent primary timer pulses will advance the program ring to its succeeding stage in the normal manner, or whether the succeeding stage will be blocked and some other predetermined program stage will be turned "on." If this predetermined program stage is a later one, then the process of selecting it is referred to as skipping, but if this predetermined stage is a prior one, then the process of selecting it is called iterating.

The principal object of this invention, therefore, is to provide a more flexibly operable calculator program unit, for a computer such as is disclosed in said above mentioned patent and to provide a more flexible program unit for any program control system.

Another object is to provide a circuit capable of rapidly returning to a predetermined previous program step in a pluggably wired type of calculator program.

A further object is to provide a new circuit capable of skipping and iterating program steps in a pluggably wired type of calculator program.

Still another object is to provide a flexible program system which can skip and iterate program steps in an electronic ring program timer with a minimum of external pluggable wiring.

Another object is to provide in combination, a calculator program unit selectively operable to rapidly skip or not skip a group of program steps and means controlled by test means operable in a previous program step for selectively producing or not producing said rapid skipping.

A further object is to provide in combination, a calculator program unit selectively operable to quickly iterate or not iterate a group of program steps and means controlled by test means operable in a previous program step for selectively producing or not producing said rapid iteration.

Another object is to provide a circuit which can control an electronic ring so as to selectively produce a skipping of ring stages.

Still another object is to provide a circuit which can control an electronic ring so as to selectively produce an iterative action of ring stages.

Other objects of the invention will be pointed out in the following description and claims, and illustrated in the accompanying drawings, which disclose, by way of example, the principle of the invention and the best mode, which has been contemplated, of applying that principle.

In the drawings:

Figs. 1A, 1B and 1C, arranged in a horizontal sequence, comprise a complete wiring diagram showing a portion of a computer embodying the preferred form of the invention.

Fig. 2 is a timing chart illustrating primary timer pulses and the timing of machine function pulses.

Fig. 9 is a timing chart illustrating the pulses produced in various circuits when the program ring is wired for skipping.

Figs. 16, 17, 18, 19 and 20 are detailed circuit diagrams and the respective block representations of electronic triggers employed in the invention.

Figs. 21 to 28 are detailed circuit diagrams and the block representations of electronic pentagrid switching circuits employed in the invention.

Figs. 29 to 34 are detailed circuit diagrams and the respective block representations of inverter circuits employed in the invention.

Fig. 35 is a detailed circuit diagram and the corresponding block representation of a diode "Or" circuit employed in the invention.

Fig. 36 is a detailed circuit diagram and the corresponding block representation of a modified "Or" circuit employed in the invention.

Figure 1C:
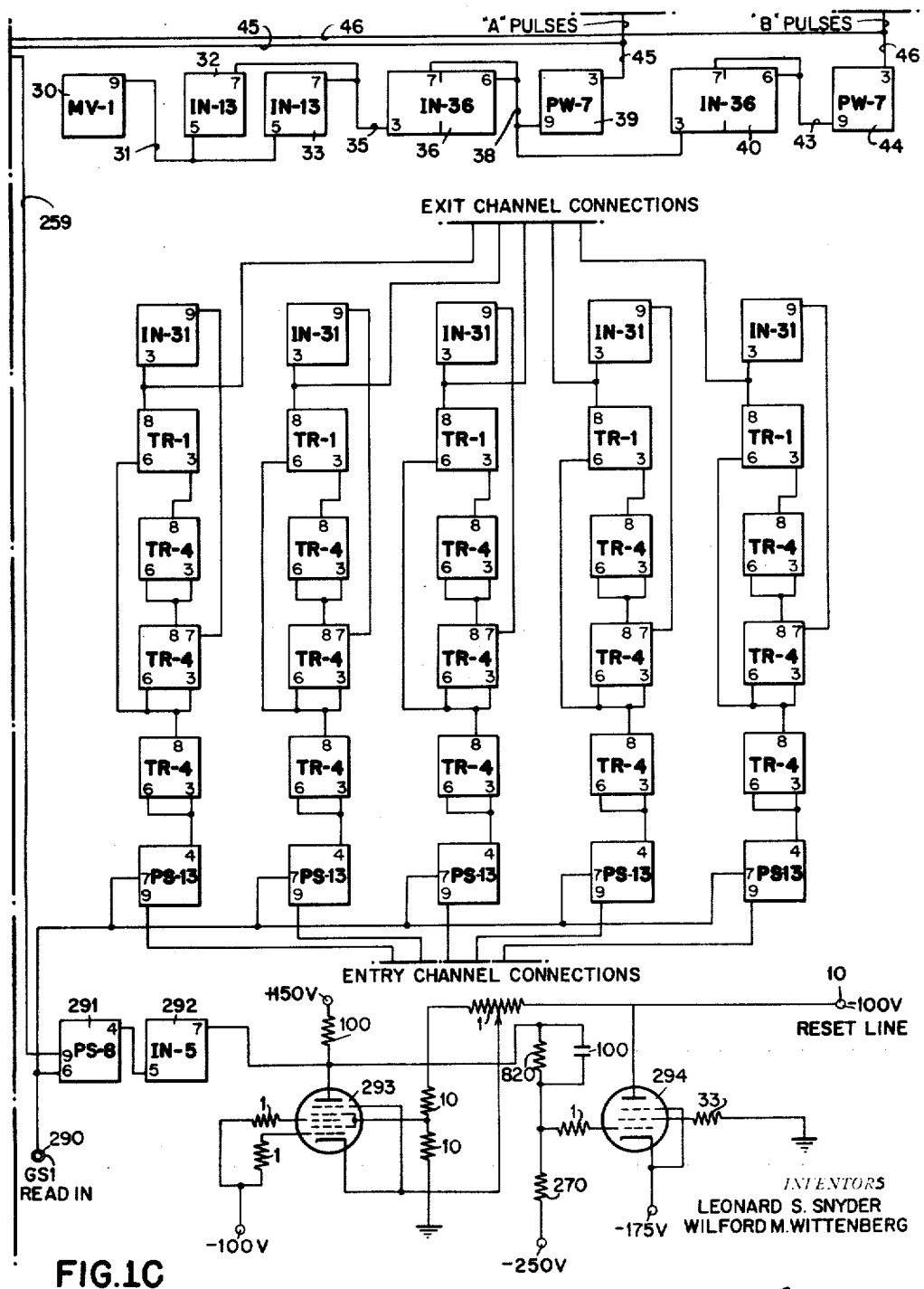

Wherever shown, unless otherwise indicated in the drawings the values for the various resistors and condensers are in thousands of ohms and micro-microfarads, respectively. For example, a resistor labeled 200 indicates 200K (200,000) ohm resistor; a condenser labeled 100 indicates a 100 micro-microfarad condenser.

The terms "positive" and "negative" potentials used in the discussion of the circuits refer to relative values, rather than values with respect to ground.

The novel skip and iteration circuit is embodied in the programming portion of a calculator but it is to be expressly understood that the use of these novel means as part of a programming device and in conjunction with a calculator is illustrative only in order to clearly point out the precise operation of the invention.

Referring generally to Figs. 1A, 1B and 1C of the drawings, it will be seen that the different elements comprising the invention are represented by blocks, whose contents are illustrated in other figures of the drawings, the inputs and outputs only being indicated in Figs. 1A, 1B and 1C. Before proceeding with a description of the program circuit and its novel associated skip and iteration circuit, a detailed description of the respective elements such as the multivibrator, cathode followers, power tubes, triggers, inverters, pentagrid switches and "Or" circuits, will be given. The contents of the respective blocks and the respective block representations are shown in Figs. 11 to 36.

Multivibrator

Figure 11:
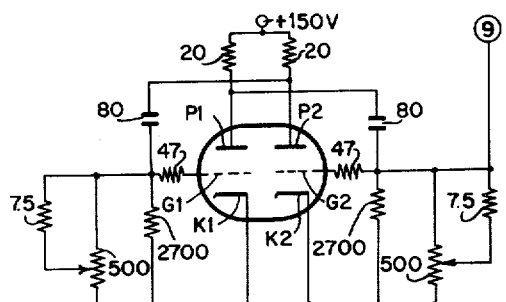
Fig. 11 is a detailed circuit diagram of a multivibrator employed in the invention and its corresponding simplified block representation.

In Fig. 11, there is shown a type of multivibrator whose block symbol is labeled MV-1. This multivibrator comprises, for example, a type 6J6 dual triode tube, the two triodes being contained in one envelope. Two such triodes with normally conducting grids, when retroactively capacity coupled will oscillate in a manner now well-known in the art. This device is called a multivibrator and in the present invention is used as the parent source of square pulses supplied to the calculator.

Referring to Fig. 11, plate P1 of the left hand triode is coupled via an 80 micro-microfarad condenser, in series with a 47K ohm resistor to a grid G2 of the right hand triode. Connected between ground and the junction of this condenser and resistor are a 500K ohm potentiometer, in parallel with a 2700K ohm resistor. A 7.5K ohm resistor is connected between the same junction and a tap on the 500K ohm potentiometer. Plate P1 of the left hand triode is connected via a 20K ohm resistor to a +150 volt source while plate P2 of the right hand triode is connected to the same +150 volt source through another 20K ohm resistor. Cathodes K1 and K2 are commonly connected to ground. Plate P2 is coupled to grid G1 by an 80 micro-microfarad condenser in series with a 47K ohm resistor. Connected between ground and the junction of this condenser and resistor are a 500K ohm potentiometer, in parallel with a 2700K ohm resistor. A 7.5K ohm resistor is connected between this latter junction and a tap on the 500K ohm potentiometer. The frequency of the multivibrator can be set to 50 kc. by varying the taps on the two 500K ohm potentiometers and the square wave output is taken from output terminal "9" which is connected as shown.

Triggers

Referring to Figs. 16 to 20, inclusive, the details of several electronic triggers are shown, designated respectively TR-1 through TR-4 and TR-13 which are commonly known in the art as the Eccles-Jordan type trigger. These each comprise two cross-coupled triodes (which may be included in one envelope, such as, for example, a type 6J6 tube) in which a plate P1, of a left hand triode, is coupled by means of a 200K resistor in series with a 1K resistor, to the grid G2 of a right hand triode, and plate P2 of the right hand triode is likewise coupled to the grid G1 of the left hand triode by a 200K ohm resistor in series with a 1K ohm resistor, each of these 200K resistors being shunted by a 100 micro-microfarad condenser, as shown. Grid G1 is connected via the 1K resistor, in series with a 200K resistor, to a terminal "5" and through the same 1K resistor, in series with a 40 micro-microfarad condenser, to an input terminal "6." Grid G2 is connected by identical circuitry to a terminal "4" and to an input terminal "3." Plates P1 and P2 of all the triggers are similarly connected to a +150 volt power supply via pairs of 12K and 7.5K ohm resistors in series, as shown. The cathodes K1 and K2 of all the triggers are grounded, as shown.

Trigger TR-2 has a 10 micro-microfarad condenser connected between the input circuits, as shown, in order to obtain more stabilized operation; the condenser tending to prevent operation by transient pulses.

The triggers differ from each other mainly in the specific connections of the output terminals. In triggers TR-1 and TR-2 (Figs. 16 and 17, respectively), a terminal "8" is directly connected to P1 while a terminal "7" is directly connected to P2, as shown. In trigger TR-3 (Fig. 18) a terminal "7" is connected to P1, a terminal "8" is connected to the tap between the plate resistors of P2 and a terminal "9" is directly connected to P1. In trigger TR-4 (Fig. 19), a terminal "7" is directly connected to P2, a terminal "8" is connected to the tap between the 7.5K ohm resistor and the 12K ohm resistor of P2. In trigger TR-13 (Fig. 20), a terminal "7" is connected to the tap between the 7.5K ohm resistor and the 12K ohm resistor of P1 while a terminal "8" of trigger TR-13 is connected to the tap between the 7.5K and the 12K ohm resistors of P2.

As is now well-known in the art, the triggers described have two conditions of stability. When the left hand triode of the trigger is conducting, the voltage at plate P1, with the circuit values indicated, is lowered from approximately +140 volts to approximately +40 volts, which, through the coupling previously described, maintains the grid G2 relatively negative, so that the right hand triode is blocked when the left hand triode conducts. Thus, if the left hand triode is conducting, then plate P1 and its corresponding output are negative, and plate P2 and its corresponding output are positive. This comprises one state of stability of the trigger and will hereinafter be designated as the "on" condition. In a similar manner, if the right hand triode is conducting, the reduction in voltage on the plate P2 is applied by the coupling connection, previously described, to the grid G1, to thus block the left hand triode so that plate P1 and its corresponding left hand output now become positive and this condition will hereinafter be designated as the "off" condition.

If, for example, the right hand triode is conducting (trigger "off"), a negative voltage applied to its grid G2 via input terminal "3," will flip the trigger "on," by blocking the right hand triode and thus rendering the left hand side conductive. Likewise, if the left hand triode is conducting (trigger "on"), a negative voltage applied to its grid G1, via input terminal "6," for example, blocks the left hand side of the tube thus flipping the trigger "off." The above two methods are normally used for flipping the triggers "on" and "off."

Another method known as "plate pullover" may be employed to flip a trigger "on." This consists of applying a —100 volt pulse, directly to the plate P1 of a trigger. Since plate P1 is coupled to grid G2, this acts to apply a negative pulse to G2 and thus render the right hand triode non-conducting thus flipping the trigger "on."

In the operation of the invention, it is required that some of the triggers be reset "on" and others reset "off," before the start of an operation. To reset a trigger "on," a sufficiently positive voltage is applied to grid G1 to cause the left hand side of the 6J6 tube to conduct. The triggers used are so designed that a positive shift applied to either input terminal "6" or to terminal "3" and through the 40 micro-microfarad condenser to the grids will not flip the triggers. However, by applying a positive voltage conductively through terminal "5" or "4" and through the corresponding resistor to one of the grids, the trigger will be flipped. In triggers which are to be reset "on," terminal "4" is connected to a —100 volt negative bias supply, and terminal "5" is connected to a "—100 volt reset" line 10 (Fig. 1C). The "—100 volt reset" line 10 is then shifted from —100 volts to ground potential (relatively plus) in a manner referred to later, when it is desired to reset the trigger, ground potential being sufficiently positive to thus reset the trigger "on" by rendering the left hand triode conductive.

In triggers which are to be reset "off," it is the terminal "4" which is connected to the "—100 volt reset" line 10 while terminal "5" is connected to the —100 volt negative bias supply, so that when the "—100 volt reset" line 10 is shifted to ground potential, the right hand triode is rendered conductive thus resetting the trigger "off."

Inverters

Inverter circuits, designated IN–4, IN–5, IN–13, IN–14, IN–31, and IN–36, respectively, are illustrated respectively, in Figs. 29 through 34. The function of an inverter is to take a positive voltage supplied to its input terminal and produce a negative voltage at its output terminal. Conversely, negative inputs produce positive outputs.

Each inverter may comprise, for example, one half of a dual triode type 6J6 tube, except the inverter IN–36 (Fig. 34) which is shown as employing both halves of the dual triode illustrated. The cathodes of all the inverters are connected to ground, as shown.

In inverters IN–4 and IN–5 (Figs. 29 and 30) respectively, the grid is connected via a 47K resistor and a 430K ohm resistor to a source of —100 volts and is also connected to an input terminal "5" through the same 47K resistor, in series with a 390K ohm resistor, shunted by a 100 micro-microfarad condenser as shown. The plate is connected to a +150 volt power supply through 12K and 7.5K ohm resistors, in series. IN–4 differs from IN–5 in that the output terminal "7" of IN–4 is connected to the junction of the 7.5K and the 12K ohm resistors, while inverter IN–5 has its output terminal "7" connected directly to the plate.

Inverter IN–13 (Fig. 31) is similar to inverter IN–5, except that its input terminal "5" is connected directly through a 47K resistor to the control grid and no negative bias supply is provided.

Inverter IN–14 (Fig. 32) is similar to inverter IN–13, except that its input terminal "5" is also connected via a 15K ohm resistor to a —100 volt negative bias supply.

Inverter IN–31 (Fig. 33) has an input terminal "3" which is connected to the grid of the triode through a 25 micro-microfarad condenser and a 1K ohm resistor. A —100 volt source is applied to one end of a 510K ohm resistor connected at its other end to a 39K ohm resistor which in turn is connected to ground. The junction of the 510K ohm resistor and the 39K ohm resistor is connected via the above mentioned 1K ohm resistor to the grid of the triode whose plate is connected directly to an output terminal "9."

In inverter IN–36 (Fig. 34), a —100 volt source is connected to one end of a 430K ohm resistor whose other end is connected via a 390K ohm resistor shunted by a 100 micro-microfarad condenser to a terminal "3." The junction of the 430K ohm resistor and the 390K ohm resistor is connected via one 47K ohm resistor to the grid G1 and via another 47K ohm resistor to the grid G2. Plate P1 of the left hand triode is connected directly to an output terminal "7" and is also connected via a 12K ohm and a 7.5K ohm resistor, in series, to a +150 volt supply, while plate P2 of the right hand triode is connected directly to an output terminal "6" and is also connected via a 12K ohm and 7.5K ohm resistor, in series to the +150 volt supply.

Cathode followers

Figure 14:
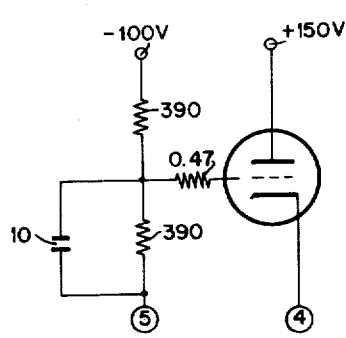
Figs. 14 and 15 are detailed circuit diagrams and the respective block representations of cathode followers employed in the invention.
Figure 15:
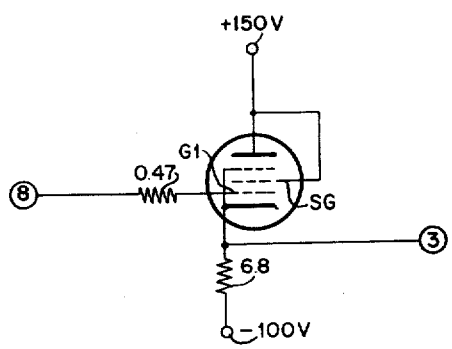
Figure 21:
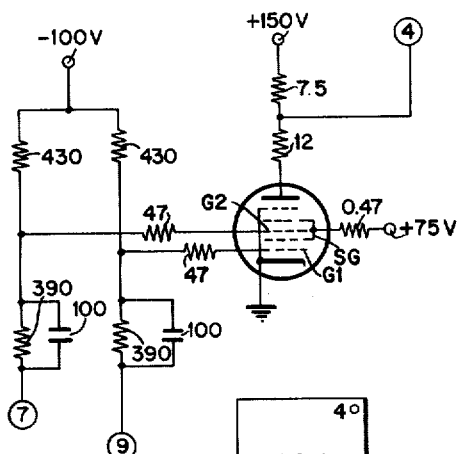
Figure 22:
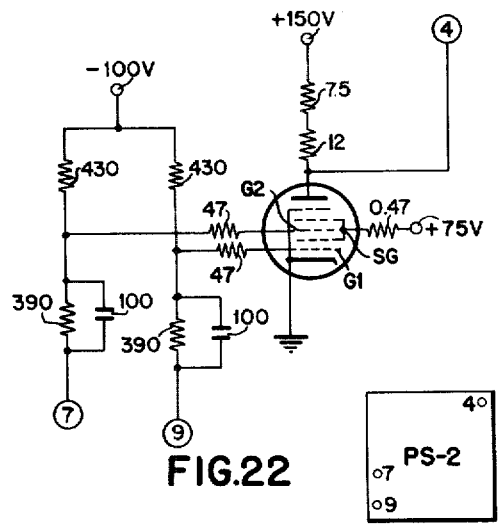
Figure 23:
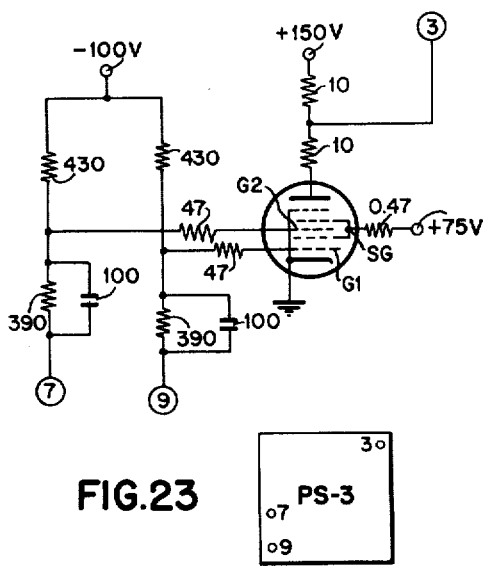
Figure 24:
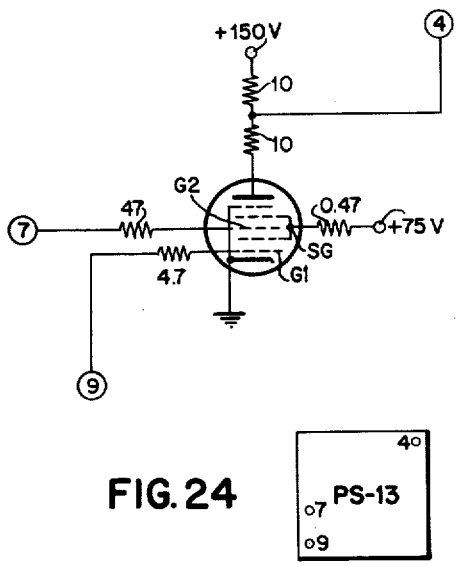
Figure 29:
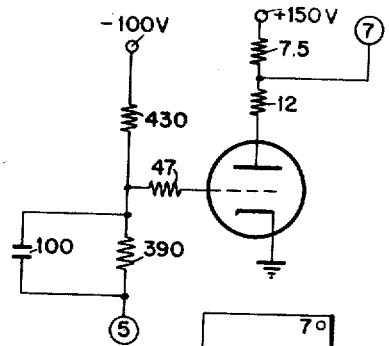
Figure 30:
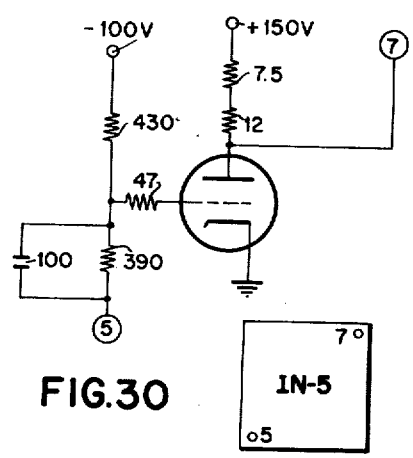
Figure 31:
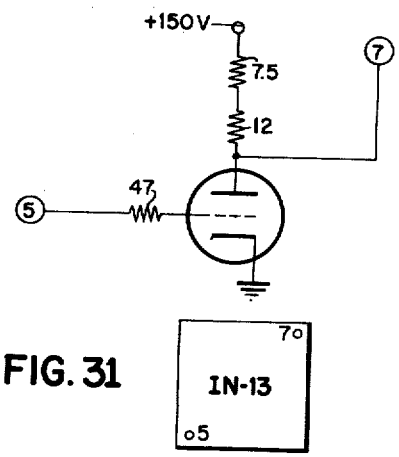
Figure 32:
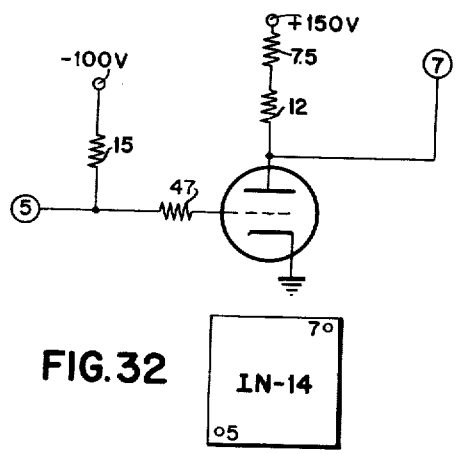
Figure 33:
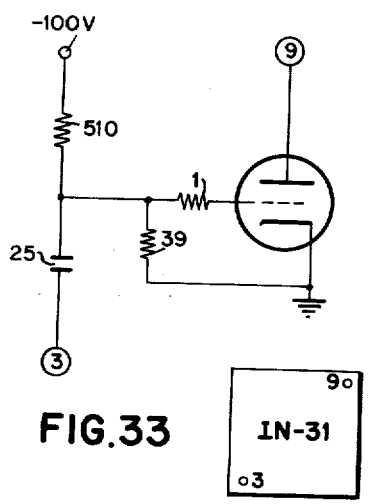

Referring to Figs. 14 and 15, there is illustrated therein, types of cathode followers whose block symbols are labeled CF–6, and CF–21 respectively. A cathode follower may be defined as a vacuum tube circuit in which the input signal is applied to the control grid, but the output, instead of being taken from the plate, is taken from between the cathode and the cathode load circuit which may comprise its own resistor or a resistor in another circuit, for example. The cathode follower is capable of producing a power gain, without a voltage inversion.

The cathode follower CF–6 (Fig. 14) comprises a single triode which may actually be one of the triodes only, of a dual triode 12AV7 type tube. The grid of the cathode follower CF–6 is connected through a 0.47K ohm resistor, in series with a 390K resistor, to a negative bias supply of —100 volts and is also connected through the same 0.47K resistor, in series with another 390K resistor, shunted by a 10 micro-microfarad condenser, to an input terminal "5." The plate is directly connected to a +150 volt power supply and the cathode, as shown, is connected to an output terminal labeled "4."

The cathode follower CF–21 (Fig. 15) comprises a type 6BK5 pentode tube. The grid G1 of the cathode follower CF–21 is connected via a 0.47K ohm resistor to an input terminal "8." The plate and the screen grid SG are commonly connected to a +150 volt supply and the suppressor grid and cathode are commonly connected via a 6.8K ohm resistor to a —100 volt bias supply. The cathode is also connected to an output terminal "3."

Pentagrid switches

Figs. 21 through 28, respectively, illustrate electronic switching circuits and their blocks PS–1, PS–2, PS–3, PS–13, PS–8, PS–14, PS–22 and PS–23, respectively. Each electronic switching circuit may employ a pentagrid tube of the 6BE6 type.

Each of these switches require simultaneously applied positive voltages at the respective input terminals connected to their grids G1 and G2, in order to cause conduction of the respective tube, so that a negative output is produced when and only when both inputs are positive.

Each pentagrid tube has its cathode grounded, as shown, and its suppressor grid directly connected to the cathode. The screen grid SG of each pentagrid switch is connected via a 0.47K resistor to a source of +75 volts.

The grid G1 of pentagrid switch PS–1 (Fig. 21) is shown as connected by means of a 47K ohm resistor, in series with a 430K resistor, to a voltage source of —100 volts and is also connected through the same 47K ohm resistor, in series with a 390K ohm resistor, shunted by a 100 micro-microfarad condenser, to an input terminal "9." Grid G2 is connected through a 47K ohm resistor, in series with said 430K ohm resistor, to said source of —100 volts and is also connected through the same 47K resistor, in series with said 390K resistor, shunted by a 100 micro-microfarad condenser, to an input terminal "7." The plate of switch PS–1 is connected through 12K and 7.5K ohm resistors, in series, to a +150 volt supply. An output terminal "4" is connected to the junction of the 7.5K ohm and 12K ohm resistors.

Switch PS–2 (Fig. 22) is exactly like the switch PS–1, except that its output terminal "4" is connected directly to the plate.

Switch PS–3 (Fig. 23) is also exactly like switch PS–1, except that it has two 10K ohm resistors, in series, connecting its plate to the +150 volt supply and its output terminal "4" connected to the junction of the two 10K ohm resistors. Switch PS–13 (Fig. 24) has its plate connected through two 10K ohm resistors to a +150 volt supply and an output terminal "4" connected between the two 10K ohm resistors. Grid G1 of switch PS–13 is connected through a 4.7K ohm resistor to an input terminal "9." Grid G2 of PS–13 is connected through a 47K ohm resistor, to an input terminal "7."

That is, output terminal "4" is connected between the two 10K ohm resistors instead of directly to the plate, and there is no —100 volt source connected via a 15K ohm resistor to the grid G1, which grid is connected only through a 47K ohm resistor to an input terminal "9."

Switches PS–8, PS–14 and PS–22 of Figs. 25, 26 and 27, respectively, each has its plate connected through two 10K ohm resistors, in series to a +150 volt supply. The output terminal "4" of switch PS–14 (Fig. 23) is a tapped output connected between the two 10K ohm plate resistors. The other two pentagrid switches PS–8 (Fig. 25), and PS–22 (Fig. 27) have their output terminals "4" connected directly to their respective plates.

Grid G1 of the switch PS–8 (Fig. 25) is connected, through a 47K ohm resistor to an input terminal "6" and said grid G1 is also connected via the same 47K ohm resistor and a 15K ohm resistor in series, to a —100 volt negative bias supply. Grid G2 is connected through a 47K ohm resistor in series with a 430K ohm resistor, to a —100 volt bias supply. Grid G2 is also connected through the same 47K ohm resistor and a 390K ohm resistor, shunted by a 100 micro-microfarad condenser to an input terminal "9."

Grid G1 of switch PS–14 (Fig. 26) is connected through a 4.7K ohm resistor, in series with a 430K ohm resistor, to a source of —100 volts and is also connected through the same 4.7K ohm resistor, in series with a 390K ohm resistor shunted by a 40K micro-microfarad condenser to an input terminal "9." Grid G2 is connected through a 47K ohm resistor to an input terminal "6."

Grid G1 of the switch PS–22 (Fig. 27) is connected through a 4.7K ohm resistor to an input terminal "9" and from there, through a 40 micro-microfarad condenser to an input terminal "7." Grid G1 is connected to ground via a 200K ohm resistor and is negatively biased, through the above-mentioned 4.7K ohm resistor connected in series with a 1000K ohm resistor to a source of —100 volts. Grid G2 is connected through a 47K ohm resistor to an input terminal "6."

The grid G1 of switch PS–23 (Fig. 28) is connected by way of a 47K ohm resistor, in series with a 390K resistor, shunted by a 100 micro-microfarad condenser, to an input terminal "9," and this grid G1 is also connected, by the same 47K ohm resistor, in series with a 430K ohm resistor, to a source of —100 volts. Grid G2 is connected, through a 100K ohm resistor, to an input terminal "6" and from there through a 22 micro-microfarad condenser to an input terminal "7." Grid G2 is negatively biased through the same 100K ohm resistor connected in series with a 1000K ohm resistor connected to a source of —100 volts and is also connected via said 100K resistor in series with a 200K ohm resistor connected to ground, as shown. The plate of switch PS–23 is directly connected to a terminal "4" and it does not have a plate resistor of its own but may use one of another circuit.

Power tubes

Figure 12:
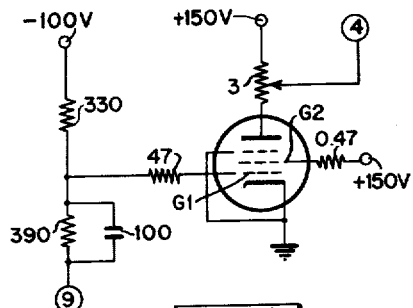
Figs. 12 and 13 are detailed circuit diagrams and the respective block representations of power tubes employed in the invention.
Figure 13:
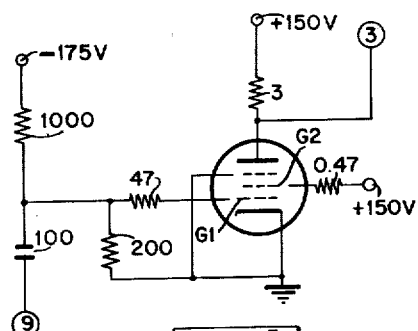

Referring to Figs. 12 and 13, power tube circuits are illustrated therein, designated as PW–2 and PW–7, respectively. A power tube is one which is capable of producing a power gain from an input signal with, however, a voltage inversion. The circuits shown in Figs. 12 and 13 include a pentode, which may be of the 6AQ5 type, with a grounded cathode, and a suppressor grid directly connected to the cathode. The grid G2 is connected, through a 0.47K resistor, to a source of +150 volts. The plate is connected to a +150 volts power supply, through a 3K ohm resistor.

Power tube PW–2 (Fig. 12) has an output terminal "4" connected to a tap on said 3K resistor. The grid G1 is connected through a 47K resistor, in series, with a 330K resistor, to a —100 volt negative bias supply. Grid G1 is connected through the same 47K resistor, in series with a 390K ohm resistor, shunted by a 100 micro-microfarad condenser to an input terminal "9."

Grid G1 of power tube PW–7 (Fig. 13) is connected through a 47K ohm resistor, in series with a 100 micro-microfarad condenser, to an input terminal "9." Grid G1 receives its negative bias through the same 47K resistor connected to a divider network comprising a 200K resistor connected to ground, as shown, and a 1000K resistor connected to a source of —175 volts. An output terminal "3" is connected to the plate of power tube PW–7.

"Or" circuits

An "Or" circuit is used where there are two or more inputs which must be isolated from each other but which must operate in such a way that any one or more than one input will produce an output.

The "Or" circuit shown in Fig. 35 is the type in which either or both inputs must go negative in order to obtain a negative output. This "Or" circuit has its block insignia labeled OR–1 and comprises two diodes of a dual diode 6AL5 type tube using a common plate resistor of 100K ohms tied to a +150 volt plate supply. An output terminal "7" is tied to the plates. An input terminal "4" is tied to the left hand cathode and an input terminal "6" is tied to the right hand cathode.

When the plates of two diodes, whose cathodes are normally held at the same potential as the plate, have a common plate resistor, the combined circuit can be an "Or" circuit. With both cathodes at +150 volts, there is no conduction in the diodes and the plates are at the same potential as the +150 volt plate supply. The value of the plate resistor is chosen so that it is high in comparison with the resistance of the conducting diode. Therefore, if either or both cathodes go negative causing conduction, the voltage drop across the diodes is small compared to that across the plate resistance, and the plates drop effectively to the voltage at the cathode, creating a negative shift at output terminal "7."

Another circuit employed in the invention is shown in Fig. 36. This comprises two type PS–8 switches (Fig. 25) and one type IN–14 inverter (Fig. 32) without plate resistors, the respective plates being conductively connected, as shown in Fig. 36, and connected via a common 20K ohm plate resistor to a +150 volt source. Because of the common 20K ohm plate resistor, this circuit acts similar to an "Or" circuit. If the inverter is actuated by a positive input, or either of the switches are actuated by two positive inputs, a negative output will result.

While specific tube types and values of resistors and condensers have been defined in connection with the multivibrator, cathode follower, power tubes, triggers, inverters, "Or" circuits, and switches, these are to be taken as exemplary only and the tube type and values may be varied in accordance with the knowledge of those skilled in the art, without departing from the spirit of the invention.

Electronic calculator

Before proceeding to the operation of the novel skip and iteration circuit, per se, it is believed that a brief description of an electronic calculator which utilizes this invention as a part thereof, will highlight the operation of the skip and iteration circuit. Basically, the calculator used is the one fully described in the previously mentioned patent to R. L. Palmer et al., with certain changes in its program ring to adapt it for direct incorporation of this invention into the calculator, along with certain other minor changes described specifically later.

The source of basic operating pulses for said calculator comprises a multivibrator, to be described presently, which supplies a series of so-called "A" pulses which are produced at the rate of 50 kc. , and a series of so-called "B" pulses which are produced at the same rate , but 180° out of phase with the "A" pulses, these being illustrated diagrammatically in Fig. 2. These pulses drive a primary timer circuit, which comprises series of triggers cascade connected in a "ring circuit," and so operated that only one trigger will be "on" at any one time, and all the others will be "off." The ring is reset so that the first trigger of the ring is "on" and all the other triggers are "off." When successive "A" pulses are applied to the ring, the respective triggers are turned "on," in succession, each preceding trigger in being switched "off" acting to turn its succeeding one "on."

The primary timer, which in the Palmer et al. patent previously mentioned, is a ring of 23 such triggers, has outputs from the various triggers which develop pulses (or voltage conditions) at certain times in the primary cycle. These are used for controlling gating circuits which are thereby permitted to transmit a definite number of "A" or "B" pulses, to a circuit element, or to operate a device directly.

The electronic calculator circuits comprise electronic counters each consisting of a group of four cascade connected triggers interconnected to produce certain feedbacks, whereby the normal binary cascade operation is altered to decade operation, as shown basically in the patent to B. E. Phelps, 2,584,811, issued February 5, 1952.

Several such counters each including carry means, comprise a multi-ordered electronic accumulator. There may be any desirable number of counters in the accumulator, the accumulator of said Palmer et al. patent comprising 13 orders. The calculations, per se, take place in the accumulator.

Storage devices are also provided which comprise similar electronic counters and carry means.

The main purpose of the electronic calculator of said Palmer et al. patent is to perform a series of repetitive calculations, starting with factors punched, in successive record cards, with the various steps under control of manually plugged wiring. This calculator is employed for all types of calculations including addition, subtraction, multiplication and division, and series of calculations comprising various combinations of these specific types of calculation. To perform these various operations, transfer of factors between the storage devices and the accumulator must be performed. A program ring of 20 steps is disclosed herein to supply, to exit hubs, a series of output voltages, one step at a time, to be used in selecting the order of the functions to be performed by the calculator. Obviously, any desired number of exit hubs may be so employed.

The exit hubs which are connected by external plugging to selected function control hubs, are activated by the program ring, while the program ring has its basic timing controlled by the primary timer, so that the program ring steps, from one program step to the next step, at the beginning of each such primary timer cycle. If other controls to be described presently were not provided, the program exit hubs would be made active, in succession, with the program steps, from one to the next, occurring at the beginning of each primary timer cycle.

"A" and "B" pulses

The source of high speed pulses used throughout the calculator will now be described. A multivibrator of the MV-1 type (Fig. 11) and labeled 30 (Fig. 1C) is provided as the source of these pulses. This multivibrator, as previously stated produces approximately square topped pulses at its output terminal "9." Since this output of the multivibrator is not a true square wave, means are provided to shape the pulses into a square wave. This is done by means of triode clippers, which utilize only a portion of the waveform from the multivibrator to produce perfect square waves, all in a manner described in the above-identified Palmer et al. patent.

For the proper operation of the calculator, it is necessary to have two pulse sources, displaced in time from each other. As stated above, these two trains of pulses are called "A" pulses and "B" pulses. Fig. 1C illustrates the necessary circuits for generating these "A" and "B" pulses. The operation is as follows:

The output terminal "9" of multivibrator 30 (Fig. 1C) is connected, in parallel, via a lead 31, to two IN–13 type inverters 32 and 33, respectively, having commonly connected input and output terminals. This parallel connection of inverters is known as the first clipper. The output of the first clipper is fed, via lead 35, to a second clipper, which comprises a type IN–36 inverter 36 (see also Fig. 16). The commonly connected outputs of this sec- clipper 36 is connected, via lead 38, to both a PW–7 type power tube 39 (see also Fig. 6) and to another IN–36 type, third clipper 40. The commonly connected outputs of this third clipper 40 are connected, via lead 43, to another PW-7 type power tube 44.

The input of the first clipper 32 and 33 is supplied by the output of the multivibrator 30 and each time a negative pulse appears at the input of the first clipper 32 and 33, a negative pulse also appears at the output of the second clipper 36 and a positive pulse appears at the output of the third clipper 40, and obviously, the reverse is also true.

Both the second and third clippers are capacitively coupled (see Fig. 6) to the normally conducting power tubes 39 and 44. Since such normally conducting tubes will recognize only negative pulses, the first power tube 39 will produce a positive output pulse only when the output of the clipper 36 goes negative, and the power tube 44 will produce a positive output pulse only when the output of the clipper 40 goes negative. The pulses produced by the first power tube at lead 45, are known as "A" pulses, while the pulses produced by the second power tube at a lead 46 are known as "B" pulses. It is thus apparent that each time the input to the first clipper 32 and 33 goes negative, an "A" pulse is produced and that likewise each time the first clipper 32 and 33 input goes positive a "B" pulse is produced. The timing of these "A" and "B" pulses is shown in Fig. 2. At 50 kc. operation, the "A" pulses (or "B" pulses) occur at 20 microsecond intervals and each pulse is of 10 microseconds duration. It is apparent then, that in any train of pulses, the "A" pulses always occur first, and the "B" pulses always occur next.

Primary timer

Basically, the primary timer comprises a ring of electronic triggers, each comprising a step and each comprising a pair of cross coupled triodes (of the type generally, as shown in the Overbeck Patent 2,404,918). The primary timer ring illustrated in instant application and described presently consists of 23 primary timer steps, only one step being "on" at any particular time. Upon simultaneous application of a pulse to each of the triggers of the ring, as described in said Overbeck patent, the stage that is "on" goes "off" and in going "off" flips the next stage "on." With each incoming pulse, the ring advances one step.

The primary timer ring (Figs. 1A and 1B) comprises triggers consecutively "step 1" to "step 23" inclusive. Trigger "step 7" is a type TR-3 (Fig. 18) while the other triggers "step 2" to "step 23" are of the type TR-4 (Fig. 19). Trigger "step 1" is a type TR-13 (Fig. 20) and is of the type that is reset "on" while all the others in the ring are reset "off." Leads 50 to 71, inclusive, respectively, connect the right hand output of each of the triggers "step 1" to "step 22" inclusive, to the right hand inputs of the respective succeeding trigger, while lead 72 (Fig. 1B) closes the primary timer ring by connecting the output terminal "8" of the last trigger "step 23" (Fig. 1B) to the right hand input of trigger "step 1" (Fig. 1A). An input lead 75 (Figs. 1A and 1B) supplied with negative pulses, is connected via leads 81 to 103, respectively, to each of the left hand inputs of all the 23 primary timer triggers.

The first negative input pulse on line 75 acts via line 81 to turn "off" the trigger step which as stated has been initially reset "on," but this pulse does not effect any of the other triggers since they have been reset "off." When trigger "step 1" goes "off," its plate P2 (Fig. 1) goes negative, as previously described, and this negative swing is applied from its output terminal "8" via line 50 to the input terminal "3" of trigger "step 2," to thus turn this trigger "step 2" "on." The next pulse on line 75 acts via line 82 to turn "off" trigger "step 2" which thus turns trigger "step 3" "on." This stepping process continues until the last trigger "step 23" goes "off," which via line 72 at the terminal starts the ring all over again.

When primary timer triggers "step 2" goes "on," its terminal "7" goes positive and applies a positive pulse via a lead 120 (Figs. 1A and 1B) to a type PW-2 power tube 121. The power tube 121 acts to increase the power output and invert the pulse which becomes a negative input pulse applied via a lead 122, to advance the program ring, as will be presently described.

The above mentioned input lead 75 for the primary timer ring, is connected to the output terminal of a PS-3 type switch 125 (Fig. 1A). Its grid 2 input terminal "7" is supplied with positive pulses via lead 45 from a source of +A pulses previously described. Grid 1 input terminal "9" of this switch is connected via a lead 127 (Figs. 1A and 1B) to the right hand output terminal "7" of a type TR-2 Calculate Start-Stop trigger 128.

When it is desired to start calculating, this Calculate Start-Stop trigger 128 is reset "on" by applying a cam produced pulse to input terminal "5" (see Fig. 17) as described in detail in said Palmer et al. patent. The positive voltage which is thus produced at terminal "7" is applied via lead 127 (Figs. 1B and 1A) to condition grid 1 of switch 125 (Fig. 1A) to allow the positive "A" pulses, from lead 45, to pass through switch 125 and start advancing the primary timer ring. At the end of the program, the Calculate Start-Stop trigger 128 is turned "off" via a line 130 (Fig. 1B) in a manner to be presently described, which thus produces minus at terminal "7," which is applied via lead 127 to the grid 1 of switch 125 to thereby block the positive pulses from lead 45 from passing through switch 125, and the primary ring is stopped. Prior to initiation of another calculation, the primary ring is reset, as described above.

*Pulse notation and primary cycle*

As has been previously described, the home position of the primary timer ring is "step 1" (Fig. 1A), while the last position is "step 23" (Fig. 1B). Each time the primary timer advances, from "step 23" back to "step 1," one cycle of operation is completed. Thus, a group of 23 successive pulses constitutes one electronic cycle, known as the primary cycle. Each such cycle of the calculator can thus be considered to be divided into 23 cycle points. Thus, when the primary timer is reset to normal, the calculator is at 1. When trigger "step 2" is "on," the calculator is at 2, and when trigger "step 12" is "on," the calculator is at 12, etc.

In order to simplify electronic timing terminology, a reference notation has been set up which uses the suffixes "A" and "B." As previously described, "A" pulses are always produced first at the input of the first clipper 32 and 33 (Fig. 1C), and "B" pulses are always produced next. Therefore, as can be seen in Fig. 2, between successive "A" pulses, there is always a "B" pulse.

Since the primary timer is advanced by "A" pulses, each step may be suffixed by the letter "A," to refer to a particular cycle point. Thus, when the primary timer is reset to normal, the calculator is said to be at 1A. Then as can be seen in Fig. 2, the next "A" pulse advances the timer to 2A, etc. Between 1A and 2A, there is a "B" pulse known as 1B, and between 2A and 3A, there is a pulse 2B, etc.

A pulse lasting from the beginning of one "A" pulse to the beginning of the next "A" pulse is called an AB pulse. An AB pulse, therefore, includes both an "A" pulse and a "B" pulse. Since the primary timer advances on successive "A" pulses, any one step will be "on" from the receipt of one "A" pulse until the receipt of the next "A" pulse. Consequently, the primary timer advances in AB steps and the primary timer ring triggers produce AB pulses. The "on" sides of the ring triggers produce −AB pulses, while the "off" sides produce +AB pulses. All pulse notations are preceded by a plus or minus sign to indicate whether the pulse is a positive pulse or a negative pulse.

The term "gate" is used to signify a duration, from one cycle point to another. A positive pulse, lasting from 3A to 8B is abbreviated +(3A−8B)G. A train of pulses is suffixed by the letter P rather than G. Thus, a series of +B pulses occurring between 11B and 19B is abbreviated +(11B−19B)P.

*Program ring*

The program ring includes a home position trigger 151 (Fig. 1B) and twenty triggers 152 to 171, inclusive. All the triggers are of type TR-3 (Fig. 18). Trigger 151 is of the type that is reset "on" before the start of calculation, while all the others are initially reset "off". The tapped output terminal "8" of home position trigger 151 is connected via a lead 175 directly to the right hand input of program trigger 152. The tapped output terminal "8" of program trigger 152 is connected to the cathode of a diode 177 which may, for example, comprise a GE 1N-52 crystal diode coupled at its anode to a terminal 178 and from there to the right hand input of program trigger 153.

Each of the triggers 153 to 171 is connected to the succeeding trigger circuit via a diode in a manner similar to the connection between triggers 152 and 153 while the lead 130 connects the output terminal "8" of the last program trigger 171, to the left hand input of the previously mentioned calculate Start-Stop trigger 128. The input lead 122, supplying negative pulses (−2AB) pulses from the primary timer (in a manner described above) is connected through leads 191 to 211, inclusive to each of the respective left hand inputs of triggers 151 to 171, inclusive.

The first negative input pulse on line 122 acts via line 191 to turn "off" the home position trigger 151 (Fig. 1A), which as stated, has been initially reset "on," but this pulse does not affect any of the other triggers since they have all been reset "off." When trigger 151 goes "off," its plate P-2 goes negative, as previously described, and this negative swing is applied from its output terminal "8" via line 175 to the input terminal "3" of trigger 152, to thus turn this trigger 152 "on." The next pulse on line 122, acts via line 192 to turn "off" trigger 152 which then applies a negative voltage through diode 177 to turn trigger 153 "on." This stepping process continues, until the last trigger 171 goes "off," which, via line 130 turns "off" the Calculate Start-Stop trigger 128, thereby ending the program.

Normally, the diodes between the program triggers do no more than permit a pulse from a preceding stage to turn "on" a succeeding stage. However, as will be presently described, when skipping or iterating is required, the diode acts in conjunction with other circuit elements to block the succeeding trigger stage from going "on."

Figure 4:
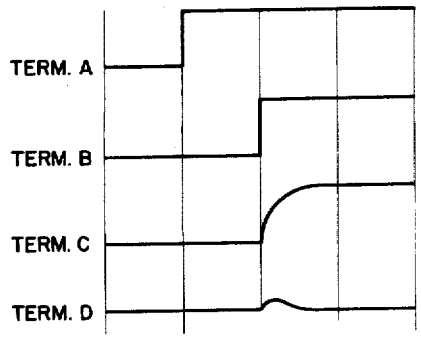
Figs. 4, 5, 6 and 7 are a series of timing charts illustrating the effects of variations in voltages at terminals A and B of Fig. 3 on the voltages at terminals C and D.

Leads 221 to 240, inclusive, respectively, connect the output terminals "9" of each of the triggers 152 to 171, inclusive, to inputs of cathode followers to control calculation in a manner to be presently described. Home position trigger 151 is not connected to a cathode follower because no calculation is desired while the home position trigger 151 is "on." In Figs. 1A and 1B, only the cathode followers which are connected to triggers 152, 161, 165 and 171, are shown, but it is to be understood that there are cathode followers connected to each of the triggers of the program ring. Lead 221 is connected to leads 245, 246 and 247, which are connected, respectively to the inputs of cathode followers 248, 249 and 250, which are of the type CF-6 (Fig. 4). The output of the respective cathode followers are leads 251, 252 and 253, which are connected respectively, to the program Exit hubs #1 labeled 254, 255 and 256, respectively. Three such program exit hubs are provided for each and every program step.

When program step 1 trigger 152 goes "on," its right hand output terminal "9" goes positive. This positive voltage is applied through lead 221 to the inputs of cathode followers 248, 249 and 250. When the input of these cathode followers go positive, the program Exit hubs #1 become positive. As the program ring advances, the program Exit hubs 2 to 20 in sequence, likewise become positive for activating program functions.

The types of functions which can be activated by the program Exit hubs in the calculator, as described in said Palmer et al. patent are Storage Read-In, Storage Read-Out, Counter Read-In Plus, Counter Read-In Minus, Counter Read-Out, Counter Read-Out and Reset, Multiply, Divide and Balance Test.

In this list of functions, the reference to "Counter" is intended in the art to refer to an accumulator operation.

The novel means of the present invention also contemplate a new function to be known as "Select" which is capable of skipping and iterating and which will be described in detail presently. The output terminals "7" of each of the program triggers 152 to 171, inclusive, respectively, are connected to program Input hubs #1 to #20 inclusive. Two such program Input hubs are provided for each and every program step and they are utilized for turning "on" a predetermined program step during skipping and iteration in a manner to be later described.

*Primary timer controlled pulses*

Various gating pulses and trains of pulses are developed, under control of the primary timer as is described in detail in said above mentioned Palmer et al. patent. Briefly, the more pertinent ones will be summarized here.

As stated above, when primary timer trigger "step 2" is turned "on," a positive pulse is transmitted via lead 120 (Fig. 1A) to power tube 121 (Fig. 1B) where it is inverted and fed via lead 122, to advance the program ring. This pulse from trigger "step 2" is a +2AB pulse while the inverted pulse, which advances the program ring, is a —2AB pulse, as shown in the timing diagram, Fig. 2.

A+(3A—8B)G pulse, called a "gate," as stated above, is used in the electronic reset circuit. The circuit for producing this gate is shown in Fig. 1A and comprises a TR-4 type trigger 258 feeding to an output lead 259. This trigger is turned "on," at 3A time, and "off" at 8B time. A —3AB pulse is fed to the "off" side grid of trigger 258 to turn it "on", via a lead 261 from an 1N-4 type inverter 260. The input to inverter 260 is derived from output pin "7" of primary timer "step 3" via lead 264. The "on" side, grid of trigger 258 is fed a —8B pulse, to turn it "off", via a PS-3 type switch 365 and lead 266. This —8B pulse is produced by mixing, in switch 265, a +8AB pulse, from the "off" side of the primary timer trigger "step 8" via lead 267, and +B pulses, fed to PS-3 via lead 268.

A circuit for developing a +(10A) pulse on lead 275 (Fig. 1A) comprises the "step 10" trigger, switch 280 and inverter 281 on whose output lead 275 the +(10A) pulse is produced as described in said Palmer et al. patent. This +10A pulse is shown in Fig. 2.

A circuit for developing a train of pulses labeled +(11B—19B)P (Fig. 2) is shown in Figs. 1A and 1B comprising the "step 11" trigger, the trigger 282, switch 283 and inverter 284 on whose output line 276 this pulse is produced under control of the "step 20" trigger, controlled by the "step 19" trigger acting via inverter 285 as described in said above-identified Palmer et al. patent, while a "gate" +(20B–1A)G is produced on the output line 277 of a trigger 286 (Fig. 1B) under control of the "step 1" trigger, line 277a, and the "step 20" trigger acting via switch 287.

These gates and pulses are available, at the times described, in order to control the order of operation, within an electronic cycle, each of the above-mentioned program steps being equal to one electronic cycle of the primary timer. During this electronic cycle, certain selected operations can occur, for example, Reset, Add-Subtract Control, Transfer and Carry.

If the particular function plugged to the program requires a Reset operation, this Reset occurs after the new program step is initiated at 2A time, the Reset operation beginning at 3A time and controlled by the "gate" +(3A—8B)G. During this Reset time, either a storage unit or the accumulator may be reset.

The +(10A)P, the +(11B—1B)P, and the $$+(20B—1A)G$$

are utilized for Add-Subtract Control, Transfer and Carry. During Add-Subtract Control time, a determination is made as to whether the factor being read into the accumulator should be entered in True or in Complement form.

During the Transfer portion of the cycle, electronic Transfer between the storage units and the accumulator or vice versa, takes place, and the +(11B—19B)P pulses are used, in combination with a "gate" to select the required number of pulses, to be transferred.

All Carry operations in the accumulator take place during the Carry portion of the cycle.

As an example, of the Reset operation, it is always necessary, before reading into a storage unit, to Reset that storage unit, so that the first operation, in a storage Read-In function, is a resetting of the storage unit, by a +(3A—8B)G "gate."

The Reset circuit is illustrated in Fig. 1C. Upon application of a positive voltage, from a program Exit hub to a GS1 Read-In hub labeled 290 in Fig. 1C, this positive voltage is applied to terminal "6" of a PS-8 type switch 291, to condition its grid 1, so that the +(3A—8B)G "gate" received over lead 259 will cause switch 291 to conduct which applies a pulse to an inverter 292 which then acts on the Reset circuit comprising the multigrid tube 293 and the pentode 294, as described in said Palmer et al. patent, to cause the —100 volt Reset line 10, to rise to ground potential. This relatively positive pulse is applied to all the Reset terminals of General Storage GS1 triggers (see terminals "4," Fig. 14, for example), to reset the triggers as described above.

Operation such as Add-Subtract Control, Transfer, and Carry always occur later in any particular electronic cycle than does Reset since Reset always starts at 3A time. Reset, therefore, is the earliest operation which takes place and it is to be noted that Reset occurs in the "active" part of a cycle.

Since the program ring is advanced at 2AB time, if a predetermined program step is not turned "on" because means are provided for skipping it or returning it to a previous step, then the particular function allocated to that predetermined step will not be performed because when the primary timer trigger "step 3" goes "on," that predetermined program step will not be "on" to control the operations that take place.

Diode gating and blocking

Figure 3:
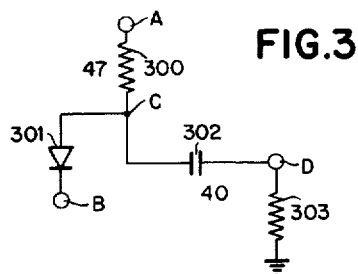
Fig. 3 is a diagrammatic illustration of a diode gating circuit employed in the program ring.

The skip and iteration circuit operates essentially by interrupting the program ring at one stage and selecting some other stage to be turned "on." The program ring is interrupted by effectively blocking the pulse from the stage going "off," which normally turns the succeeding stage "on." To understand how this blocking action is accomplished it is first necessary to understand the diode gating circuit shown in Fig. 3.

This diode gating circuit is described in detail in the L. R. Harper Patent 2,580,771, and is shown in Fig. 3 as consisting of an input terminal A connected via a 47K ohm resistor 300 to a terminal C which is connected to the plate side of a GE IN-52 crystal diode 301 whose cathode side is connected to a terminal B. Terminal C is also connected through a 40 mmf. condenser 302 to a terminal D which, in turn, is connected via a resistor 303 to ground.

In Figs. 4 to 7 are shown the effects that varying the voltages at terminals A and B of Fig. 3 have on terminals C and D. For purpose of illustration and simplification, it will be assumed that the voltage at terminal A can be either +95 volts or +145 volts and this is true for the voltage at terminal B, too. By means of Figs. 4 to 7, it will be shown that the only way to get a negative pulse at terminal D which is sharp enough to flip a trigger, is to maintain the voltage at terminal A at +145 volts and simultaneously, shift the voltage at terminal B negatively from +145 volts to +95 volts.

Fig. 4 illustrates a condition where originally the voltages at terminals A and B are +95 volts and then terminal A shifts positive followed some time later by a positive shift at terminal B. When terminals A and B are both at +95 volts, there is no difference of potential across the diode 301 which, therefore, does not conduct. Since diode 301 is not conducting, there is no voltage drop across resistor 300 and the voltage at the anode of the diode 301 and terminal C are at the same potential as terminal A which is +95 volts. Since there is no current flowing through resistor 303, and, therefore, no voltage drop across it, the top of resistor 303 and terminal D are at ground potential.

When terminal A rises (Fig. 4), there is conduction through the diode 301 and resistor 300. Since the resistance of the diode 301 when conducting is small compared to the 47K ohms of resistor 300, there is a negligible drop across the diode and so the voltage at the anode of the diode and at terminal C remains at approximately +95 volts which is the voltage at terminal B. Since there is no change of voltage at terminal C, the voltage at terminal D remains the same.

Later, when the voltage at terminal B rises sarply to +145 volts (Fig. 4) the voltage at terminal C will rise to +145 volts, but it cannot rise sharply, as condenser 302 must charge exponentially through resistor 303 and the 47K ohm resistor 300. As terminal C rises exponentially, the voltage at terminal D tends to follow it up, but as capacitor 302 gets charged up, the decrease in current causes a decreased voltage drop across resistor 303 and causes the voltage at terminal D to return to its original level. This positive rise is so slight that if terminal D were connected to the grid of a trigger, the trigger would not be affected.

Figure 5:
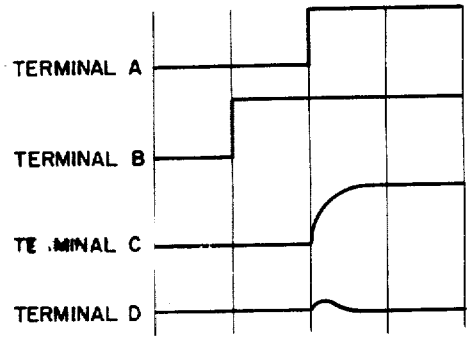

Fig. 5 differs from Fig. 4 only in that the voltage at terminal B rises first and later the voltage at terminal A rises. When the voltage at terminal B rises, the diode 301 remains cut off and there is no voltage drop across resistor 300, and so the voltage at terminal C remains at the voltage of terminal A which is +95 volts.

Later, when the voltage at terminal A rises sharply (Fig. 4), the voltage at terminal C tends to rise to the same level by an exponential charging of capacitor 302 through resistor 303 and resistor 300. The voltage at terminal D then rises slightly and falls just as in Fig. 4 and again this rise is not enough to affect a trigger.

Figure 6:
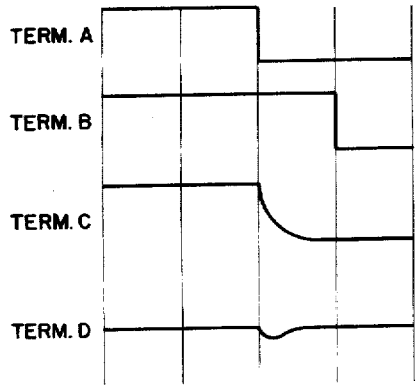

Fig. 6 illustrates a condition where the voltages at terminals A and B are both +145 volts and then terminal A shifts negative, followed some time later by a negative shift at terminal B. In the initial stage, diode 301 is not conducting and so terminal C is at the +145 volts of terminal A. When the voltage at terminal A falls sharply, the diode 301 is still cut off but there is an exponential discharging of capacitor 302 through resistors 300 and 303 and the voltage at terminal C falls exponentially. As terminal C falls, the voltage at terminal D tends to follow it down but as capacitor 302 gets charged up, the decrease in current causes a decreasing voltage drop across resistor 303 and causes the voltage at terminal D to return to its original level.

Figure 7:
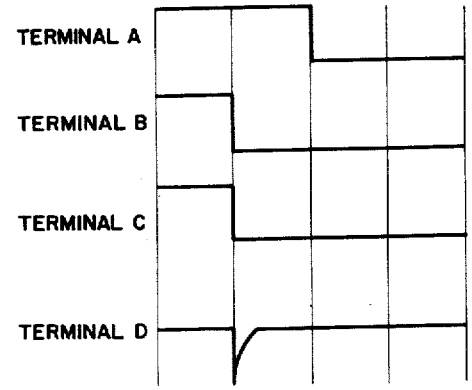

Fig. 7 differs from Fig. 6 only in that the voltage at terminal B falls before the voltage at terminal A. When the voltage at terminal B falls sharply, there is an immediate conduction of the diode 303 which causes terminal C to fall sharply to approximately the potential of terminal B. The sharp fall at terminal C causes capacitor 302 to discharge through resistor 303 and diode 301. At the first instant, capacitor 302 acts as a short circuit and so instantaneously there is a large negative voltage drop across resistor 303 and there is, therefore, a sharp fall in voltage at terminal D.

This sharp negative shift at terminal D can be used to flip a trigger. The voltage at terminal D returns to its original level quickly because capacitor 302 does not discharge through the high resistance 300.

It can now be seen that only when the conditions of Fig. 7 are met will there be a pulse at terminal D sharp enough to flip a trigger, i. e., if while a resistance input terminal A is conditioned positive, a negative pulse is applied to the diode input terminal B, a sharp negative pulse will appear at the condenser output terminal D. Use is made of this principle of diode gating in the novel skip and iteration circuit which will be presently described.

There is an above-described diode gate between each of the stages of the program ring. Connected to the terminal "8" of trigger 152 (Fig. 1A) which is the first stage of the program ring is a terminal B-1 which in turn is connected to the cathode of the diode 177. The anode of diode 177 is connected to a terminal C-1 and via a 47K ohm resistor 350 to a terminal A-1 and a common lead 351. As has been previously described, terminal C-1 is also connected to terminal "3" of type TR-3 trigger 153. In Fig. 18, it can be seen that terminal "3" of a TR-3 trigger is connected via a 40 micro-microfarad condenser to a terminal D and thence to the 200K ohm resistor which is tied to terminal "4."

The diode 177, resistor 350, the 40 micro-microfarad denser and the 200K ohm resistor just discussed comprise the diode gate previously described and there is a similar diode gate between each of the stages of the program ring. Terminals A, B and C of the diode gate of Fig. 3 are equivalent to terminals A-1, B-1 and C-1 of the diode gate following trigger 153, and to terminals A-2, B-2 and C-2 following trigger 154, and similarly through the terminals A-20, B-20 and C-20 following trigger 171. The manner in which the diode gates in the program ring operate will be discussed presently.

Select circuit

The terminals A-1 through A-20 inclusive, are connected to the common lead 351 which is connected via a lead 355 (Fig. 1B) to the output of a CF-21 type cathode follower 356. The input of the cathode follower 356 is connected via a lead 357 to the output of an OR-1 type "Or" circuit 358.

The left hand input of "Or" circuit 358 is connected via a lead 360 to the left hand output of a TR-3 type Select trigger 361 which is part of a Select circuit shown at the bottom of Fig. 1A. The right hand input of "Or" circuit 358 is connected via a lead 362 to the left hand output of a TR-3 type Select trigger 363 (Fig. 1B) which is part of a Select circuit which is exactly the same as that in Fig. 1A. Each Select circuit can be plugwired to interrupt the program ring before any step and select some other step to be turned "on." Each Select circuit can perform Selection only from one chosen point in the ring, and while only two Select circuits have been shown in the drawings, it can be understood that as many Select circuits as desired may be utilized by modifying the "Or" circuit 358 in a manner well-known in the art.

The right hand output of Select trigger 361 is connected via a lead 365 to input terminal "7" of a PS-23 type switch 366. Input terminal "9" of the switch 366 is connected through a lead 367 to the lead 120 which has previously been described as a source of +2AB pulses. The output of switch 366 is connected via a lead 368 to a Pick Up hub 369. This Pick Up hub can be plugwired to an Input hub of the program step which is to be Selected.

For turning "off" the Select trigger 361, in a manner to be presently described, the left hand input of trigger 361 is connected via a lead 372 to a lead 373 which is connected to the left hand output of primary timer trigger "step 7" (a source of −7AB pulses).

The right hand input of Select trigger 361 is connected via a lead 370 to the output of a PS-1 type switch 371, which acts in a manner to be presently described for turning "on" Select trigger 361. The switch 371 has its input terminal "7" connected to a lead 375 which is connected to the right hand output of primary timer trigger "step 9" (a source of +9AB pulses). Input terminal "9" of switch 371 is connected via a lead 376 to an IN-5 type inverter 377, whose input is connected to a lead 378. The lead 378 is connected to the output terminals "4" of PS-8 type switches 379 and 380 and output terminal "7" of an IN-14 type inverter 381. Switches 379 and 380, and inverter 381 are connected effectively as an "Or" circuit, which operates in a manner described previously in relation of Fig. 36, i. e., when any of the elements 379, 380 or 381 is actuated, commonly connected lead 378 goes negative. One of the elements, inverter 381 may be actuated via a Skip No Test hub 385 and a lead 386.

Before describing the operation of a Select circuit, the plugwiring necessary to perform a Select function will be described. For example, if it is desired to skip from program step 6 to program step 10, one of the Exit hubs #6 is wired to Skip No Test hub 385 or a Skip No Test hub in another Select circuit. Then the Pick Up hub 369 is wired to one of the Input hubs #10.

It may be desirable to perform a Select function based on a balance test taken in a previous program step and such a balance test operation is described in detail in said Palmer et al. patent. When a balance test is plugged, to let us say program step 5, it develops either a Plus Voltage On Minus Balance, or a Plus Voltage On Plus Balance. The Plus Voltage on Minus Balance is applied via a line 390 (Fig. 1A) to terminal "9" of the switch 379, while the Plus Voltage on Plus Balance is applied via line 391 to terminal "9" of switch 380. If it is desired to Select on Negative Balance from step 6 of the program, program Exit hub #6 would be plugged to a Select on Negative Balance hub 393 (Fig. 1A) and thus via line 394 to terminal "6" of switch 379. Coincidence of the Plus Voltage on Negative Balance, from a previous balance test at terminal "9" of switch 379 and the previously described positive voltage from the program Exit hubs #6 applied to terminal "6" of switch 379 will cause it to conduct and create a negative shift at its output lead 378 which is used to perform a Select function in a manner to be presently described. If a Select on Plus Balance is desired, a Select on Plus Balance hub 396 (Fig. 1A) is connected to program Exit hub #6 and the coincidence of Plus Voltage on Plus Balance applied to line 391 and thence to input terminal "9" of switch 380, with a plus pulse applied via hub 396 to terminal "6" of switch 380, operates switch 379 to perform a Select action.

Figure 8:
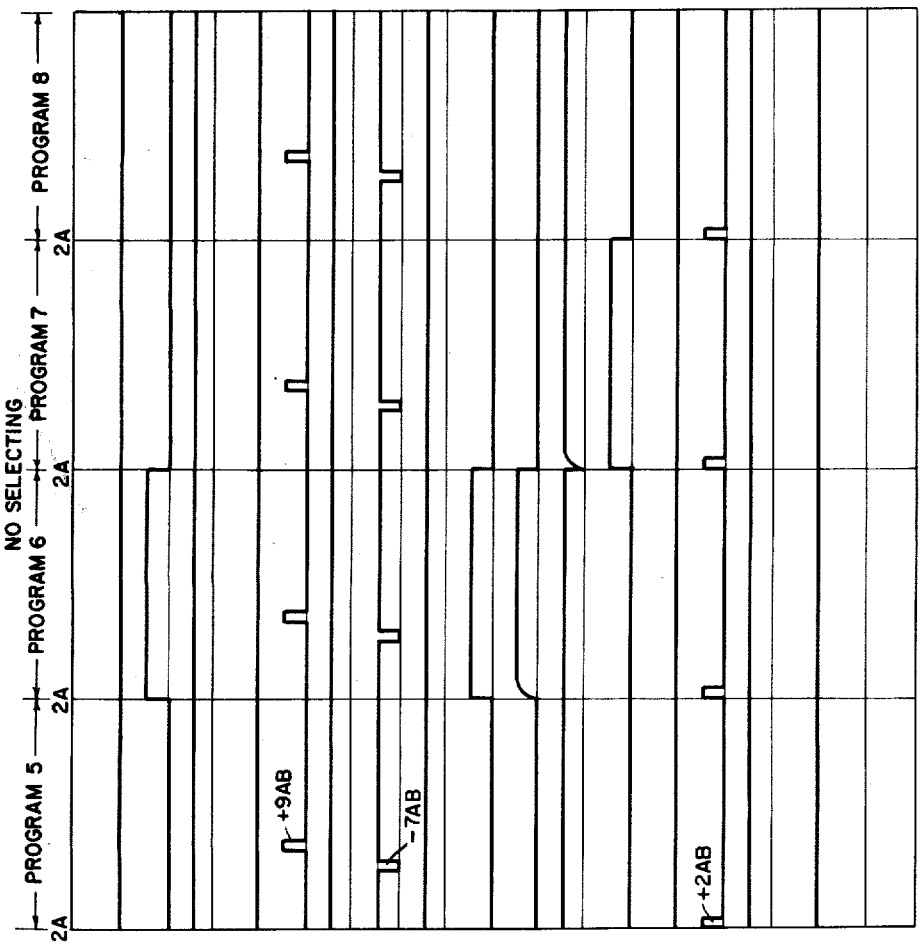
Fig. 8 is a timing chart illustrating the pulses produced in various circuits when the program ring is not wired for skipping or iteration.
Figure 9:
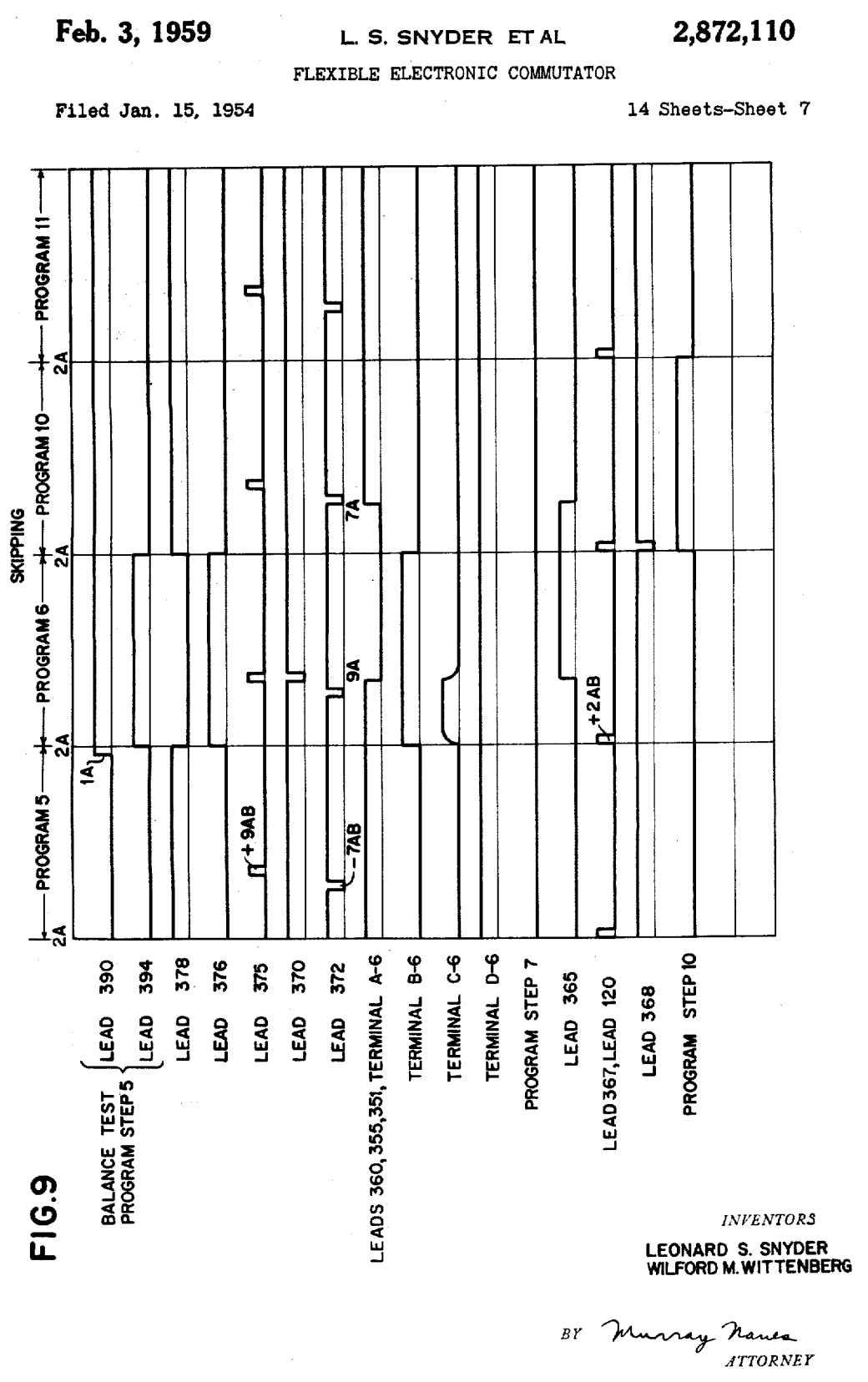
Figure 10:
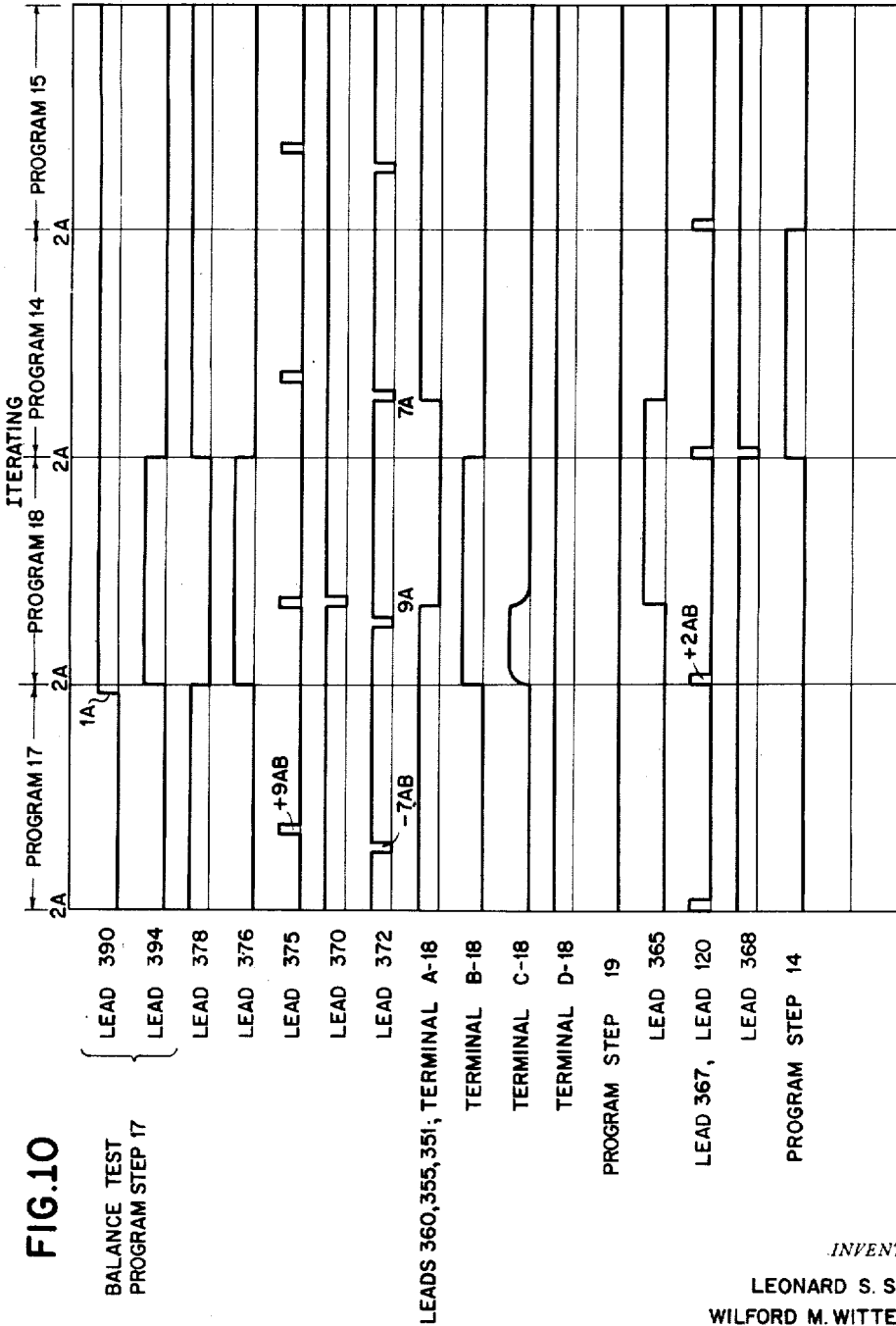
Fig. 10 is a timing chart illustrating the pulses produced in various circuits when the program ring is wired for iterating.

To illustrate the action of a Select circuit, the Select circuit of Fig. 1A will be described in conjunction with the timing charts shown in Figs. 8, 9 and 10. Fig. 8 which is a timing chart for a normal (No Select) action, is an illustration of various voltage conditions when the program ring goes directly from program step 6 to program step 7. In Fig. 9, there is an illustration of the program ring going from program step 6 to program step 10 and thus performing a skipping action. In Fig. 10, there is an illustration of the program ring returning to program step 14 from program step 18 and thus performing an iteration action.

First, Fig. 8 will be compared to Fig. 9 taking the case where a negative balance test is desired in step 5. In this problem, it will be assumed that if there is a negative balance, the program ring will skip from step 6 to step 10 but if there is no negative balance indicated, the program ring will advance from step 6 directly to step 7.

Fig. 8 assumes that there is no negative balance and thus lead 390 (Fig. 1A) does not go positive in program step 5 remaining negative all during program step 6. During program step 6, Exit hubs #6 are positive and this positive potential is applied through the plugwiring to the Select on Negative Balance hub 393 and lead 394 (Fig. 8) from where it is applied to switch 379. However, since lead 390 remains negative during step 6, the output of switch 379 at lead 378 remains positive. The positive potential at lead 378 is applied via inverter 377 (Fig. 1A) and thus lead 376 remains negative during step 6 (Fig. 8). With the negative potential of lead 376 applied to switch 371 (Fig. 1A), the +9AB pulse on line 375 (Fig. 8) during program step 6 will not pass through switch 371 and so the output of switch 371 at lead 370 will remain positive (Fig. 8) and thus will not turn "on" the Select trigger 361. Thus, it is to be especially noted that Select trigger 361 remains "off" during a No Select action. With Select trigger 361 "off," the left hand output lead 360 is positive and is applied to "Or" circuit 358. Lead 362 to the other input of "Or" circuit 358 will also be positive because only one Select circuit is used at ony one time. With the two inputs of the "Or" circuit positive, the output at lead 357 is positive and this positive voltage is fed to the input of cathode follower 356 whose output lead 355 is of the same positive polarity. Since lead 355 is connected to common lead 351, lead 351 terminals A-1 to A-20 and specifically A-6 are also positive.

The operation of the diode gate between program steps 6 and 7 will now be discussed. This is the one that contains terminals A-6, B-6, C-6 and D-6. It has been shown that when it is desired to go directly to program step 7 from program step 6 (as in Fig. 8), terminal A-6 remains positive during program step 6. During program step 5, trigger 157, which is the step 6 trigger, is "off" and so its terminal 8 and terminal B-6 is negative (Fig. 8). When trigger 157 goes "on" at the beginning of program step 6, terminal B-6 goes sharply positive. With A-6 positive, and B-6 going positive, we have the condition which was previously described with respect to Fig. 4, wherein terminal C-6 rises exponentially and the output at terminal D-6 will not effect the next trigger.

However, at the end of step 6, trigger 157 goes "off" and terminal B-6 thus goes sharply negative. With terminal A-6 still positive and terminal B-6 going negative, the condition of Fig. 7 exists, wherein terminal C–6 falls sharply and a sharp negative pulse occurs at terminal D–6, which pulse is applied to turn "on" on program step 7 trigger 158.

At the same time, it can be shown that Pick Up hub 369 which is connected to Input hubs #10 will not turn program step 10 trigger 161 "on." It will be remembered that Select trigger 361 remains "off" when there is a No Select action. With Select trigger 361 "off," its right hand output at lead 365 remains negative all during program step 6 (Fig. 8). This negative voltage is applied to input terminal "9" of switch 366 and thus prevents the +2AB pulses from lead 367 and lead 120 (Fig. 8) from passing through switch 366. Thus, the output of switch 366 at lead 368 and Pick Up hub 369 remains positive (Fig. 8). Since Pick Up hub 369 is plug-wired to Input hub #10, the fact that they remain positive means that they will not pull program step 10 "on" by plate pullover. Thus, as can be seen from Fig. 8, program step 10 trigger 161 is not turned "on" during program step 7.

It will now be assumed that the result of the negative balance test indicates a negative balance and, therefore, it is desired to skip from step 6 to step 10. As described in the Palmer et al. patent and as can be seen in Fig. 9, lead 390 (Fig. 1A) which is the input to switch 379 goes positive at 1A time of program step 5, which is when the negative balance test was taken. From the nature of the balance circuit, when lead 390 goes positive, it remains positive until another balance test is taken. Thus, when step 6 program trigger 157 goes "on," Exit hubs #6 go positive causing the Select on Negative Balance hub 391 and lead 390 to go positive. With both inputs to switch 379 positive, the output of switch 379 at lead 378 is positive (Fig. 9).

The negative voltage at lead 378 during program step 6 is inverted through inverter 377 and becomes positive at lead 376 where it is applied to condition switch 371. With switch 371 conditioned, a +9AB pulse at input lead 375 passes to the output of switch 371 and lead 370 (Fig. 9). The —9AB pulse at lead 370 turns "on" select trigger 361 (Fig. 1A). Select trigger 361 will be turned "off" during the next program step at 7A time by a —7AB pulse from lead 372 to the left hand input of Select trigger 361. Thus, Select Trigger 361 will remain "on" from 9A time of program step 6 to 7A time of the next program step. A —(9A—7A) pulse will appear at the output of Select trigger 361 (Fig. 9) and at lead 360 and this minus pulse will go through the "Or" circuit 358, the cathode follower 356, the lead 355 and appear as a —(9A—7A) pulse at common lead 351, terminals A–1 to A–20, and specifically terminal A–6.

Now that it has been shown that in skippinf from program step 6 to program step 10, there is a —(9A—7A) pulse on terminal A–6, the rest of the diode gate between program steps 6 and 7 will be described.

During program step 5, program step 6 trigger 157 is "off," and its terminal "8" and terminal B–6 are negative (Fig. 9). When trigger 157 goes "on," at the beginning of program step 6, terminal B–6 goes sharply positive. With terminal A–6 positive, and B–6 going positive, the condition exists which was previously described in Fig. 4 in which there is not enough of an output at terminal D–6 to effect the next trigger. At 9A time, terminal A–6 goes negative with terminal B–6 remaining positive. This is similar to the condition described in reference to Fig. 6 and terminal C–6 will fall exponentially, but the output at terminal D–6 will not effect the next trigger. At 2A time after program step 6, terminal A–6 is still negative and terminal B–6 drops sharply, and just as in Fig. 6, there is no output at terminal D–6. It can thus be understood that because terminal A–6 is negative when terminal B–6 goes negative at the end of program step 6, the advance pulse from program step trigger 157 is blocked and thus program step 7 trigger 158 remains "off."

When Select trigger 361 goes "on," in addition to effecting the blocking of the advance pulse to program step 7 trigger 158, it will also turn "on" the chosen program step 10 by wiring from Pick Up hub 369 to the Input hub #10. When Select trigger 361 is "on," its right hand output at lead 365 is positive (Fig. 9), thus conditioning switch 366 to allow the +2AB pulses at its input terminal "7" to pass through and create a —2AB pulse at lead 368 and Pick Up hub 369 and through the plugwiring (not shown) to the Input hubs #10 to thus turn "on" program step 10 trigger 161 by the previously explained process of plate pullover. Thus, program step 10 will go "on" and not program step 7, and a skipping action is effected.

Select trigger 361 is reset "off" by the —7AB pulse at lead 372 (Fig. 1A), effecting a rise in terminal A–6 through circuitry previously described. Referring to Fig. 9, when terminal A–6 rises at 7A time, a situation exists similar to that in Fig. 4 and no appreciable output occurs at terminal D–6.

The process of iterating is effectively the same as the process of skipping except that the Pick Up hub is plug-wired to a previous program step rather than a subsequent program step. Therefore, it is to be expected that the curves shown for iterating in Fig. 10 will be equivalent to those shown for skipping in Fig. 9. Fig. 10 illustrates the condition where there is a negative balance in program step 17, because of which the program ring is to return to program step 14 from program step 18. Assuming that the Select circuit in Fig. 1A has not been used in this problem, the Select on Negative Balance hub 393 is wired to Exit hub #18, and Pick Up hub 369 is wired to Input hub #14. The pulse from program step 18, which ordinarily turns "on" program step 19 is blocked by the diode gate composed of A–18, B–18, C–18 and D–18 and a pulse at Pick Up hub 369 will then turn "on" program step 14.

Referring to Fig. 10, it can be seen that a —(9A—7A) pulse is applied to terminal A–18 as a result of the balance test and of the Select trigger being turned "on." The voltage variation at terminals A–18, B–18, C–18 and D–18 are the same as those shown in Fig. 9 for A–6, B–6, C–6 and D–6 where the diode gate blocked the advance pulse to the succeeding program trigger and, therefore, program step 19 is not turned "on." However, just as in skipping, when Select trigger 361 is turned "on," Pick Up hub 369 goes negative and turns "on" program step 14.

There has, therefore, been described novel means for making a calculator program ring more flexible by providing means for producing skipping and iterating actions in the ring when desired. There has also been shown means for performing or not performing these Select actions under control of test means.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A commutating device comprising a chain of bistable elements individually operable to an "on" or "off" condition and only one of said bistable elements being turned to an "on" condition at any one time, means for normally forwardly stepping the "on" condition from each bistable element to its succeeding bistable element in sequence, means operative under control of a settable first predetermined element in said chain operative for halting the normal forward stepping action of the "on" condition at said first predetermined element, means under control of said halting means operative for restarting the forward stepping action at a settable second predetermined chain bistable element other than the bistable element immediately succeeding said first predetermined element, a select bistable element operative for simultaneously operating said halting means and said restarting means, and test means operative for controlling said select bistable element, the operation of said test means being initiated by the turning to the "on" condition of the chain element preceding said first predetermined element in said chain.

2. A commutating device as in claim 1, wherein said halting means includes a diode gate between every chain bistable element and its succeeding chain bistable element, all said diode gates normally conditioned by said select bistable element for permitting the normal forward stepping of the "on" condition.

3. A commutating device comprising a chain of bistable elements individually operable to an "on" or "off" condition and only one of said elements being turned to an "on" condition at any one time, means for forwardly stepping the "on" condition from one element to a next succeeding element in sequence, a select bistable element, test means under control of a settable first predetermined element in said chain, means for turning "on" said select bistable element under control of said test means, means under control of said select bistable element for halting the stepping action at the element succeeding the first predetermined element of said chain, said halting means including a diode gate between every chain element and its next succeeding chain element, said diode gate being effective to allow the stepping of the "on" condition to a succeeding chain element only when said select bistable element is "on" and said chain bistable element goes "off," and means operative simultaneously with the halting means and under control of said select bistable element for restarting the forward stepping of the "on" condition at any settable second predetermined chain bistable element previous or subsequent to the first predetermined element.

4. A commutating device comprising a chain of bistable elements, a gating means between each of said bistable elements, means for simultaneously conditioning all of said gating means, means including the gating means for normally causing sequential individual operations of said bistable elements forwardly in seriatum when all said gating means are conditioned, means for disabling said conditioning means to decondition all the gating means thereby interrupting the seriatum operation at a settable predetermined bistable element, means operative simultaneously with the disabling means for restarting said forward operations at any other settable one of said bistable elements, and a select bistable element under control of said chain for controlling said disabling means and said restarting means.

5. A commutating device as in claim 4 including test means operative for controlling said select bistable element, the operation of said test means being initiated by the operation of the element preceding the first predetermined bistable element.

6. A commutating device comprising a chain of bistable elements individually operable to an "on" or "off" condition, only one of said bistable elements being set to an "on" condition at any one time, each bistable element having input and output terminals, a gating means between each of said bistable elements, said gating means each comprising a diode input, a resistance input and a condenser output, means connecting an output terminal of each of said bistable elements to the diode input of each of said gating means, means connecting the condenser output of each of said gating means to an input terminal of the respective succeeding bistable element, an Or circuit, select bistable elements commonly connected to the Or circuit and under control of associated chain elements, means for selectively simultaneously conditioning all the resistance inputs of said gating means under control of said Or circuit, means for normally forwardly stepping the "on" condition from a bistable element to a next succeeding bistable element in sequence, including means for turning "off" the chain bistable element which is "on," the output terminal of said bistable element applying a pulse to the diode input of said gating means, said pulse being applied from the condenser output of said gating means to the input terminal of the succeeding bistable element turning in "on" only when the resistance input of said gating means is conditioned, means under control of the Or circuit for selectively operating different select bistable elements to disable said conditioning means to halt the forward stepping action at associated predetermined bistable elements in said chain, and means under control of the select bistable element operative simultaneously with the disabling means for restarting the forward stepping action at other associated predetermined ones of said bistable elements in the chain.

7. A commutating device comprising a chain of bistable elements having input and output terminals, said bistable elements individually operable to an "on" or "off" condition and only one of said bistable elements being set to an "on" condition at any one time, a diode gating means between each of said bistable elements, said gating means comprising a diode input, a resistance input and a condenser output, means connecting an output of each of said bistable elements to the diode input of said gating means, means connecting the condenser output of each of said gating means to an input terminal of the succeeding bistable element, a select bistable element, means commonly connecting said resistance inputs of all of said gating means to said select bistable element, said select bistable element simultaneously conditioning all said resistance inputs when said select bistable element is "off," means for forwardly stepping the "on" condition from a bistable element in said chain to a next succeeding bistable element in sequence, including means for turning "off" the chain bistable element which is "on," said output terminal of said bistable element thereby applying a pulse to the diode input of said gating means, said pulse being applied from the condenser output of said gating means to the input terminal of the succeeding bistable element and turning it "on" only when the resistance input of said gating means is conditioned, test means under control of a first predetermined chain element for turning "on" said select bistable element to disable said conditioning means and halt the forward stepping action at a succeeding bistable element to said first predetermined bistable element, means coupling the select bistable element to a third predetermined bistable element, and means including said select bistable element operative simultaneously with the disabling means for restarting the forward stepping action at said third predetermined bistable element, said select bistable element being controlled by said second predetermined bistable element and said test means.

8. In a calculator adapted to solve problems through the performance of settable successively programmed arithmetic steps, a program system capable of selectively changing the set order of the performance of said arithmetic steps comprising, in combination, a plurality of program function means, each of which, when actuated, performs a particular arithmetic step in a problem, a chain of elements, each of said elements being settably connected to any of said program function means, means initiating forward sequential individual operations of said elements, said elements when operated, actuate in sequence the program function means to which they are respectively settably connected, settable means for selectively interrupting the sequential operations of said elements at a predetermined element, test means, under control of a chain element preceding the predetermined element, for controlling said interrupting means, and settable means operative simultaneously with the interrupting means for operating another element in said chain from which said sequential individual operations continue, to effect a change in the order of actuation of said program function means.

9. In a calculator adapted to solve problems through the performance of settable successively programmed arithmetic steps, a program system capable of selectively changing the set order of the performance of said arithmetic steps comprising, in combination, a plurality of program function means, each of which, when actuated, performs a particular arithmetic step in a problem, a chain of bistable elements, each of said elements being settably connected to any of said program function means, means initiating forward sequential individual operations of said elements, said elements when operated, actuate in sequence the program function means to which they are respectively connected, a gating means between each of the elements of said chain, means for simultaneously conditioning all said gating means, means including said gating means for normally causing sequential individual operations of said elements forwardly in seriatum when all said gating means are conditioned, means for selectively disabling said conditioning means to decondition all the gating means thereby interrupting the seriatum operation at a settable predetermined bistable element, said disabling means being under control of said predetermined bistable element, and means operative simultaneously with the disabling means for restarting said forward operations at any other one of the bistable elements of said chain to effect a change in the order of actuation of said program function means.

10. A calculator as in claim 9 wherein each of said gating means is a diode gate comprising a diode, resistance and condenser.

11. A calculator as in claim 9 wherein said disabling means and said restarting means are controlled by a select bistable element.

12. A calculator as in claim 9 wherein said select bistable element is operated by means responsive to a test indication in a previous problem step.

References Cited in the file of this patent

UNITED STATES PATENTS

| 2,623,171 | Woods-Hill et al. | Dec. 23, 1952 |
| 2,686,299 | Eckert | Aug. 10, 1954 |

FOREIGN PATENTS

| 709,407 | Great Britain | May 26, 1954 |

OTHER REFERENCES

Burks: "Electronic Computing Circuits of the ENIAC," Proceedings of the IRE, August 1947, pages 756–767.

Wilkes: "The EDSAC—An Electronic Calculating Machine," Journal of Scientific Instruments, December 1949.